US012639873B2

(12) United States Patent
Rozantsev et al.

(10) Patent No.:  US 12,639,873 B2
(45) Date of Patent:      May 26, 2026

(54) MOTION PREDICTION USING ONE OR MORE NEURAL NETWORKS

(71) Applicant: Nvidia Corporation, Santa Clara, CA (US)

(72) Inventors: Artem Rozantsev, Zurich (CH); Marco Foco, Origlio (CH); Gavriel State, Toronto (CA)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/611,763

(22) PCT Filed: May 15, 2020

(86) PCT No.: PCT/US2020/033148
§ 371 (c)(1),
(2) Date: Nov. 16, 2021

(87) PCT Pub. No.: WO2020/236596
PCT Pub. Date: Nov. 26, 2020

(65) Prior Publication Data
US 2022/0230376 A1      Jul. 21, 2022

Related U.S. Application Data

(60) Provisional application No. 62/849,731, filed on May 17, 2019.

(51) Int. Cl.
*G06T 13/40* (2011.01)
*G06N 3/045* (2023.01)
(Continued)

(52) U.S. Cl.
CPC ............. *G06T 13/40* (2013.01); *G06N 3/045* (2023.01); *G06T 7/20* (2013.01); *G06T 7/70* (2017.01)

(58) Field of Classification Search
CPC ...... H04N 19/537; H04N 19/51; H04N 19/50; G06T 9/002; G06T 7/70; G06T 13/40;
(Continued)

(56) References Cited

U.S. PATENT DOCUMENTS 8,970,601  B1      3/2015  Orbach
11,017,560  B1 *   5/2021  Gafni ..................... G06N 3/045
(Continued)

OTHER PUBLICATIONS

Gui et al, ("Adversarial Geometry-Aware Human Motion Prediction"; Proceedings of the European Conference on Computer Vision (ECCV), 2018, pp. 786-803; https://openaccess.thecvf.com/content_ECCV_2018/html/Liangyan_Gui_Adversarial_Geometry-Aware_Human_ECCV_2018_paper.html).*
(Continued)

*Primary Examiner* — Xilin Guo
(74) *Attorney, Agent, or Firm* — Davis Wright Tremaine LLP

(57) ABSTRACT

Animation can be generated with a high perceptive quality by utilizing a trained neural network that takes as input a current state of a virtual character to be animated and predict how this character would appear in one or more subsequent frames. Such a process can be performed recursively to generate the data for these frames. During training, each frame of a generated sequence can be predicted from a result for a previous frame, and this generated sequence can be compared with a ground truth sequence using a generative network. Differences between the ground truth and generated animation sequences can be minimized, whereby a specific objective function does not need to be manually defined. Minimizing differences between the generated animation sequences and ground truth sequences during training improves the quality of network predictions for single frames at inference time.

21 Claims, 17 Drawing Sheets

(51) Int. Cl.
    *G06T 7/20*        (2017.01)
    *G06T 7/70*        (2017.01)

(58) Field of Classification Search
    CPC ............. G06T 7/20; G06T 2207/20084; G06T
               2207/30196; G06T 2207/20081; G06T
               2207/10016; G06T 2207/30221; G06T
               13/80; G06T 13/20; G06N 3/047; G06N
               3/08; G06N 3/044; G06N 3/045; G06N
               3/063; G06N 3/049; G06N 20/00; G06F
               3/147; G06F 3/011; G06F 3/04842; G06F
               3/0484; G09G 2320/10; G09G 2370/02;
               G06V 40/25; G06V 10/82; G06V 40/10;
               G06V 40/20; G06V 20/46; G06V 20/42;
               G06V 40/176; G06V 20/40; G06V 20/52
    See application file for complete search history.

(56) References Cited

U.S. PATENT DOCUMENTS

| | | | |
|---|---|---|---|
| 2013/0251204 A1 | 9/2013 | Pulsipher et al. | |
| 2015/0235430 A1 | 8/2015 | Schowengerdt et al. | |
| 2016/0360039 A1 | 12/2016 | Sanghavi et al. | |
| 2017/0372505 A1 | 12/2017 | Bhat et al. | |
| 2018/0012411 A1 | 1/2018 | Richey et al. | |
| 2018/0124425 A1 | 5/2018 | Van Leuven et al. | |
| 2019/0295305 A1* | 9/2019 | Yang | G06N 3/044 |
| 2019/0333198 A1* | 10/2019 | Wang | G06T 5/50 |
| 2020/0205697 A1* | 7/2020 | Zheng | A61B 5/1117 |
| 2021/0346761 A1* | 11/2021 | Sterling | G06N 20/00 |

OTHER PUBLICATIONS

Holden et al ("Phase-Functioned Neural Networks for Character Control"; ACM Transactions on Graphicsvol. 36, Issue 4, Article No. 42 pp. 1-13; https://doi.org/10.1145/3072959.3073663; Published: Jul. 20, 2017).*
International Search Report and Written Opinion issued in PCT Application No. PCT/US2020/033148, dated Jul. 27, 2020.
Arjovsky et al., "Wasserstein GAN," Dec. 6, 2017, 32 Pages.
Bengio et al., "Scheduled Sampling for Sequence Prediction with Recurrent Neural Networks," Advances in neural information processing systems, 2015, 9 pages.
Brendel et al., "Learning Spatiotemporal Graphs of Human Activities," International Conference on Computer Vision, 2011, 8 Pages.
Carnegie-Mellon University, "CMU Graphics Lab Motion Capture Database," Retrieved from, http://mocap.cs.cmu.edu/, 2003, 2 Pages.
Catmull et al., "A Class of Local Interpolating Splines," Computer Aided Geometric Design, Academic Press, 1974, 10 Pages.
Douillard et al., "A Spatio-Temporal Probabilistic Model for Multi-Sensor Multi-Class Object Recognition," 2007, 12 Pages.
Forgy et al., "Cluster Analysis of Mulivariate Data: Efficiency versus Interpretability of Classification," Biometrics, Sep. 1965, 2 Pages.
Fox et al., "Bayesian Nonparametric Methods for Learning Markov Switching Processes," IEEE Signal Processing Magazine, Dec. 2010, 21 Pages.
Fragkiadaki, "Recurrent Network Models for Human Dynamics," 2015, 9 pages.
Ghosh et al., "Learning Human Motion Models for Long-term Predictions," Dec. 3, 2017, 12 Pages.
Goodfellow et al., "Generative Adversarial Nets," In Advances in Neural Information Processing Systems, Jun. 10, 2014, 9 pages.
Gulrajani et al., "Improved Training of Wasserstein GANs," Advances in Neural Information Processing Systems, 2017, 17 pages.
Harvey et al., "Recurrent Transition Networks for Character Locomotion," Oct. 15, 2018, 11 Pages.
Hochreiter et al., "Long Short-Term Memory," Neural Computation, 9(8): 1997, pp. 1735-1780.

Holden et al., "A Deep Learning Framework for Character Motion Synthesis and Editing," SIGGRAPH, 16 Technical Paper, Jul. 2016, 11 pages.
Holden et al., "Learned motion matching," ACM Transactions on Graphics, 39(4): 2020, 13 pages.
Holden et al., "Phase-Functioned Neural Networks for Character Control," ACM Transactions on Graphics, 36(4): Jul. 2017, 13 pages.
Ingram et al., "The Statistics of Natural Hand Movements," Experimental Brain Research, 2008, 14 Pages.
Ionescu et al., "Human3.6M: Large Scale Datasets and Predictive Methods for 3D Human Sensing in Natural Environments," IEEE Transactions on Pattern Analysis and Machine Intelligence, 36(7): 2013, 15 pages.
ITU-T, "P.10 : Vocabulary for Performance, Quality of Service and Quality of Experience," Retrieved from, https://www.itu.int/rec/T-REC-P.10/en, 2008, 1 Page.
Jain et al., "Structural-RNN: Deep Learning on Spatio-Temporal Graphs," Proceedings of the IEEE Conference on Computer Vision and Pattern Recognition, 2016, 10 pages.
Kingma et al. "Adam: A Method for Stochastic Optimization," Dec. 22, 2014, 9 pages.
Lee et al., "Interactive Character Animation by Learning Multi-Objective Control," Nov. 2018, 10 Pages.
Lehrmann et al., "Efficient Nonlinear Markov Models for Human Motion," CVPR, 2014, 8 Pages.
Levine et al., "Continuous Character Control with Low-dimensional Embeddings," ACM Transactions on Graphics, 31(4): 2012, 10 pages.
Liu et al., "Learning to Schedule Control Fragments for Physics-based Characters using Deep Q-learning," ACM Transactions on Graphics, 36(3): Jun. 27, 2017, 14 pages.
Lloyd, "Least Squares Quantization in PCM," IEEE Transactions on Information Theory, 28(2): Mar. 1982, 9 pages.
Mao et al., "Least Squares Generative Adversarial Networks," ICCV, 2017, 9 pages.
Martinez et al., "On Human Motion Prediction Using Recurrent Neural Networks," May 6, 2017, 10 Pages.
Mirza et al., "Conditional Generative Adversarial Nets," Nov. 6, 2014, 7 pages.
Mnih et al., "Human-level Control through Deep Reinforcement Learning," Nature, 2015, 13 pages.
Pavllo et al., "QuaterNet: A Quaternion-based Recurrent Model for Human Motion," Jul. 31, 2018, 14 Pages.
Pavlovic et al., "Learning Switching Linear Models of Human Motion," Advances in Neural Information Processing Systems, 2000, 7 Pages.
Peng et al. "Deepmimic: Example-Guided Deep Reinforcement Learning of Physics-Based Character Skills", Jul. 27, 2018, 18 pages.
Sak et al., "Long Short-Term Memory Based Recurrent Neural Network Architectures for Large Vocabulary Speech Recognition," Feb. 5, 2014, 5 Pages.
Schulman et al., "Proximal Policy Optimization Algorithms," Jul. 20, 2017, 12 pages.
Tanco et al., "Realistic Synthesis of Novel Human Movements from a Database of Motion Capture Examples," IEEE Workshop on Human Motion HUMO, 2000, 6 Pages.
Taylor et al., "Dynamical Binary Latent Variable Models for 3D Human Pose Tracking," Conference on Computer Vision and Pattern Recognition, 2010, 8 Pages.
Taylor et al., "Factored Conditional Restricted Boltzmann Machines for Modeling Motion Style," International Conference on Machine Learning, 2009, 8 Pages.
Wang et al., "Gaussian Process Dynamical Models for Human Motion," Transactions on Pattern Analysis and Machine Intelligence, 2008, 36 Pages.
Zhang et al., "Mode-Adaptive Neural Networks for Quadruped Motion Control," ACM Transactions on Graphics, 37(4): 2018, 11 pages.

(56) References Cited

OTHER PUBLICATIONS

Zhou et al., "Autoconditioned Recurrent Networks for Extended Complex Human Motion Synthesis," ICLR, 2018, 13 pages.

* cited by examiner

100

400

450

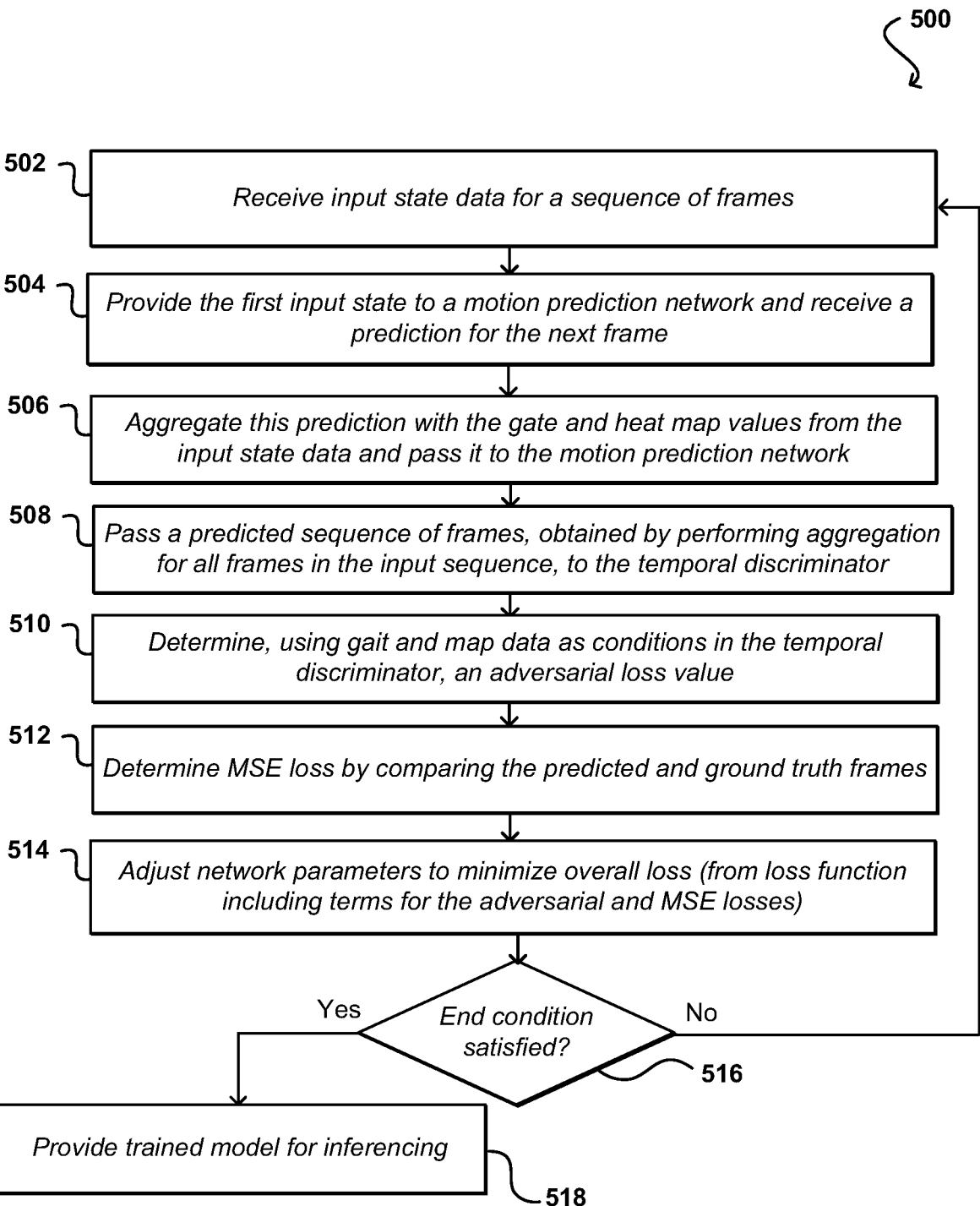

500

502   Receive input state data for a sequence of frames

504   Provide the first input state to a motion prediction network and receive a prediction for the next frame 506   Aggregate this prediction with the gate and heat map values from the input state data and pass it to the motion prediction network 508   Pass a predicted sequence of frames, obtained by performing aggregation for all frames in the input sequence, to the temporal discriminator 510   Determine, using gait and map data as conditions in the temporal discriminator, an adversarial loss value 512   Determine MSE loss by comparing the predicted and ground truth frames 514   Adjust network parameters to minimize overall loss (from loss function including terms for the adversarial and MSE losses)

Yes   End condition satisfied?   No   516

Provide trained model for inferencing   518

FIG. 5

602     Receive frame of animation

604     Provide frame as input to trained model

606     Obtain inferred data for subsequent frame(s)

DATA CENTER
800

1500

MOTION PREDICTION USING ONE OR MORE NEURAL NETWORKS

CROSS-REFERENCE TO RELATED APPLICATIONS

This is a 371 National Phase of PCT Application No. PCT/US2020/033148, filed on May 15, 2020, which claims priority to U.S. Provisional Patent Application Ser. No. 62/849,731, filed May 17, 2019, and entitled "Adversarial Training of Deep Motion Prediction Controllers," which is incorporated herein by reference in its entirety and for all purposes.

BACKGROUND

People are consuming an ever-increasing amount of digital content using devices with ever-increasing display capabilities. Accordingly, it is desirable to improve the quality of this digital content as well, such as by increasing a perceptual quality of computer animation to be displayed. Machine learning has been introduced to help improve such quality of generated animation, but existing approaches often utilize techniques that can lead to overfitting and an inability of a network to correct for its own accumulated mistakes, which can negatively impact the quality of the generated animation.

BRIEF DESCRIPTION OF THE DRAWINGS

Various embodiments in accordance with the present disclosure will be described with reference to the drawings, in which:

FIG. 5 illustrates an example process 500 for training a motion prediction model, according to at least one embodiment;

DETAILED DESCRIPTION

In applications such as gaming and animation, it can be desirable to generate or render motion of one or more virtual characters or objects. In some instances this can involve providing a virtual character, such as illustrated in the example animation frames 100 of FIG. 1A-1D, where that character can be comprised of a number of elements connected by a number of joints. In order to animate this character, pose or state information can be changed for these various joints in order to cause the corresponding elements (e.g., arms, legs, or head) of this character to move or change orientation and position appropriately. There can be various ways to provide input to adjust the pose or state of these various joints, as may involve manual input or motion capture, among other such options. FIGS. 1A through 1D illustrate example frames of a sequence of animation wherein this character is animated to appear to climb an incline. In order to properly render the animation, there can be various constraints applied, as may relate to limitations on poses of the various joints, as well as physical constraints due to the surface of the incline being climbed.

Various existing approaches can take input such as updates to pose information for one or more joints and use this to generate animation. Such approaches, however, do not always provide for realistic animation, as the animation may not be smooth or may not represent how an actual character performing such an action would move over time. In order to improve a perceptive quality of such animation, approaches in accordance with various embodiments can utilize a trained neural network that takes as input a current state of a virtual character to be animated, for example, where that state includes information for the poses of different joints in two or three dimensions, as well as angles and other information that may be useful for the animation. This network can then predict how this character would appear in one or more subsequent frames of animation, or subsequent character states. Such a process can be performed recursively to generate the data for these frames. Approaches in accordance with various embodiments can provide improved results by starting with a single initial frame, but then using this to predict a sequence of subsequent frames, where each frame is predicted from a result of a previous frame. This generated sequence can then be compared with a ground truth sequence during training, such as by using a generative adversarial network (GAN). Differences between the ground truth and generated animation sequences can be minimized, whereby a specific objective function does not need to be manually defined. Minimizing the differences between the generated and ground truth animation sequences during training can also help to improve the quality of network predictions for single frames at inference time.

Figure 1A:
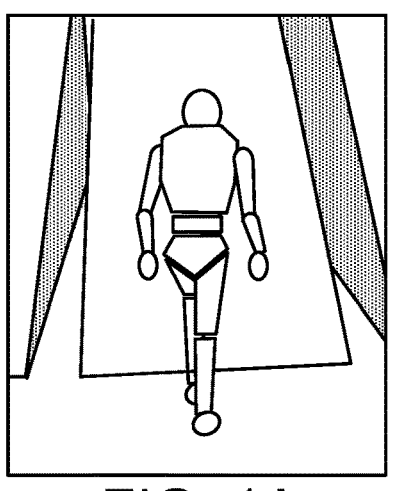
FIGS. 1A, 1B, 1C, and 1D illustrate frames of animation that can be generated, according to at least one embodiment.
Figure 1B:
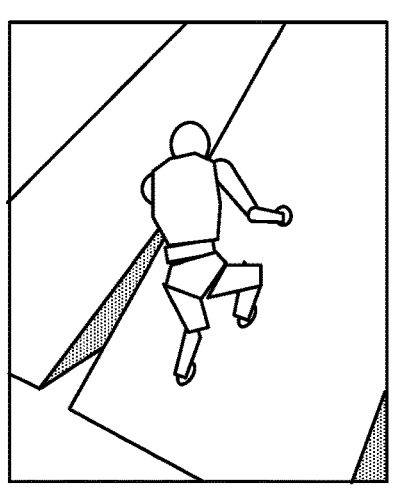
Figure 1C:
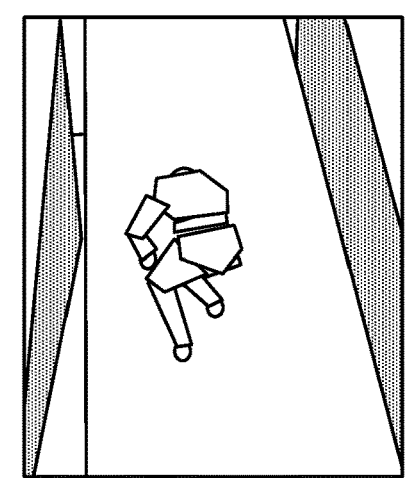
Figure 1D:
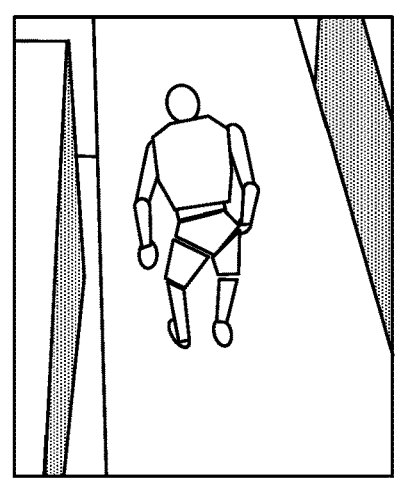
Figure 2:
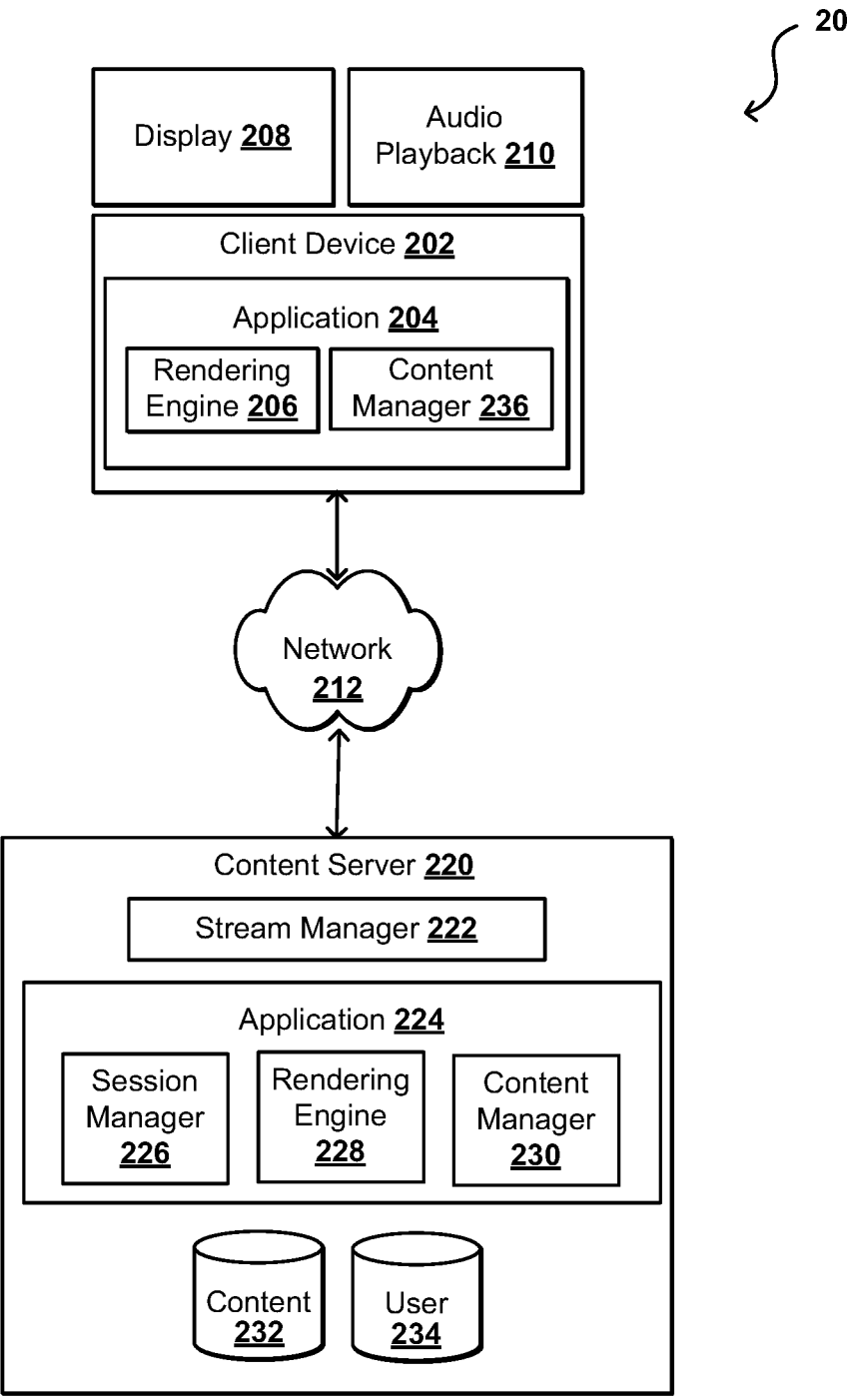
FIG. 2 illustrates a content presentation architecture that can be analyzed, according to at least one embodiment.

In at least one embodiment, content to be presented may include various types of content, as may include virtual reality (VR), augmented reality (AR), gaming, audio, or video content. In at least one embodiment, this content can be presented using a client device 202 as illustrated in system architecture 200 of FIG. 2. Client device 202 may include any appropriate device capable of at least presenting such content, as may include a desktop computer, notebook computer, set-top box, streaming device, gaming console, smart phone, tablet computer, VR headset, AR goggles, a wearable computer, or a smart television. In at least one embodiment, this content may include content transmitted across at least one network 212 from a content server 220 to a client device 202. In at least one embodiment, a content presentation application 224 executing on content server 220 can initiate a session associated with client device 202, using a session manager 226 and user data stored in a user database 234, and can cause content 232 to be rendered using a rendering engine 228, if needed for this type of content, and transmitted to client device 202 using an appropriate stream manager 222. In at least one embodiment, client device 202 receiving this content can provide this content to a content presentation application 204, which may also include a rendering engine 206, for presentation via client device 202 (such as video content through a display 208), and audio (such as sounds and music), through at least one audio playback device 210, such as speakers or headphones. In at least one embodiment, this content may already be stored on, or accessible to, client device 202 such that transmission over network 212 is not required. In at least one embodiment, a transmission mechanism other than streaming can also be used to transfer this content from server 220, or content database 232, to client device 202.

In at least one embodiment where client device 202 communicates with a remote server, application 224 can include a content manager 230 that can analyze content before this content is transmitted to client device 202. Content manager 230 can include one or more neural networks that are able to analyze this content after at least a few initial bytes are rendered and transmitted for client device 202. In at least one embodiment, content manager 230 will utilize these neural networks, or other deep learning mechanisms, to predict motion for one or more subsequent frames to be used in generating more realistic animation. In at least one embodiment, content manager 230 can store text or other data for generated animation to a content database 232. In various embodiments, this animation can be rendered using a rendering engine 228 on server 220 or a rendering engine 206 on client device 202. In at least one embodiment, this content can be transmitted to client device 202 for display or other presentation. In other embodiments, tasks such as inferencing and rendering can be performed by application 204 executing on client device 202, among other such options.

In at least one embodiment a controller can be provided for virtual characters capable of adapting to different environments and generating realistic animation. Certain existing approaches utilize networks that are able to predict motion of a virtual character based on its pose in the previous frame, as well as user input commands. While there has been a lot of progress in developing such network architecture, little attention has been focused on improving training procedures and objective functions used for these and other such networks. Accordingly, approaches in accordance with various embodiments can provide a training approach that is applicable to various architectures, including any motion prediction architecture, and provides for improvement in quality and variability of the generated animation, which can make this generated animation more visually appealing. In various embodiments, a recurrent generative adversarial network (GAN) can be utilized, which avoids the need for a hand-crafted objective function as in prior solutions. A recurrent GAN can help generated animation closely match corresponding motion data, such as motion capture data.

As mentioned, creating realistic animation of virtual characters is a challenging problem, as it can involve developing a controller that is fast and capable of adapting the motion of the character to different obstacles and terrain changes. Even with the availability of motion capture datasets, designing such a controller is a complicated problem, as it needs to incorporate information from large datasets of examples, have a low memory footprint, and be very fast at runtime. Approaches in accordance with various embodiments utilize deep learning techniques to help provide such a controller.

Certain controllers may utilize networks such as convolutional or autoregressive networks. Convolutional approaches can perform convolutional operation in the temporal domain, which leads to transformation of the input signal into desired output. While effective for various offline applications, these types of approaches are generally not suitable for real-time applications, such as for computer gaming, due at least to the fact that they typically require a full sequence of frames available as input to the network. Such a requirement presents a severe limitation, as the future frames may be affected by the actions of the user and, therefore, cannot be known in advance. Some approaches may rely on autoregressive models, such as restricted Boltzmann machines and recurrent neural networks (RNNs). The former ones typically require a model-complex training procedure, while the parameters of the latter ones can be learned with a simple stochastic gradient descent. Overall, these methods are more suitable for online applications, for example, as these methods do not require the knowledge about the future frames. A significant limitation of these techniques, however, lies in the fact that due to their autoregressive nature they tend to die out or explode when the error from multiple consecutive predictions is accumulated.

In various embodiments, a training procedure can be utilized that helps to increase a perceptual quality of generated animation. In at least one embodiment, this involves use of an autoregressive training procedure that enables a network to correct for its own pose estimation errors, without requiring any manual parameter tuning. Such a training procedure can utilize a generic objective function that is based on a conditional generative adversarial neural network architecture, which reduces discrepancy between distributions of generated character pose sequences and those from the motion capture data. Such an approach can be general in nature, such that it can be utilized with virtually any motion prediction architecture.

In at least one embodiment, input and output for a motion prediction network can utilize respective data formats. In at least one embodiment, inputs to a motion prediction network can be represented as the following vector at frame t:

$$x_t = \{t_t^p, t_t^d, t_t^a, j_{t-1}^p, j_{t-1}^v, h_t\}$$

where the description of the components is defined in Table 1. Output from this motion prediction network is vector $y_t$, which can have the following form:

$$y_t = \{t_{t+1}^p, t_{t+1}^d, j_t^p, j_t^v, j_t^r, j_t^x, j_t^z, j_t^a, f_t^c, f_t^h\}$$

$$y_t = \{t^p_{t+1}, t^d_{t+1}, j^p_t, j^v_t, j^r_t, \dot{r}^x_t, \dot{r}^z_t, \dot{r}^a_t, f^c_t, f^h_t\}$$

with notations also as defined in Table 1.

TABLE 1

Example notations that are used to describe the input and the
output states of the motion prediction system:

| | | |
|---|---|---|
| Trajectory | $t^p_t \in \mathbb{R}^{2t}$ | Positions of t trajectory samples |
| | $t^d_t \in \mathbb{R}^{2t}$ | Forward facing directions along the trajectory |
| | $t^a_t \in \mathbb{R}^{2t}$ | One-hot encoding of action types (gaits) along the trajectory |
| Joints | $j^p_t \in \mathbb{R}^{3J}$ | 3D joint positions relative to the root position |
| | $j^v_t \in \mathbb{R}^{3J}$ | Relative joint velocities |
| | $j^r_t \in \mathbb{R}^{6J}$ | Joint rotations |
| | $J$ | Number of joints |
| | $\dot{r}^{[x|z]}_t \in \mathbb{R}$ | Root translational x and z velocities |
| | $\dot{r}^a_t \in \mathbb{R}$ | Root angular velocity in the horizontal plane |
| | $f^c_t \in \mathbb{R}^4$ | Probability of foot contacts |
| | $f^h_t \in \mathbb{R}^4$ | Foot height |
| Other | $h_t \in \mathbb{R}^{36}$ | Height maps for the current time step i |
| | $p_t \in \mathbb{R}$ | Motion phase at the time step i |

Additionally to the aforementioned input and output vectors, a Phase-Functioned Neural Network (PFNN)-based approach receives a single real-valued parameter $p_t$, which denotes the phase of the current motion cycle at timestep t. Output of the PFNN can be augmented with an additional predicted parameter $\Delta p_t$ which corresponds to the phase increment that can be used to estimate the value of $p_{t+1}$ during the autoregressive inference.

In various embodiments, architectures of two different motion prediction networks can be utilized as backbone architecture for illustration. In at least one embodiment, a Phase-Functioned Neural Network (PFNN) can be utilized that consists of at least two parts: neural network F and phase function $\ominus$, which defines the parameters of F. The neural network F can be a three-layer network, which receives as input vector $x_t$ as defined elsewhere herein. Further, $F = F(x_t; \alpha)$ can depend on a set of parameters $\alpha$, namely the weights and the biases of the fully-connected layers. These parameters may not be allowed to change freely, instead they can be computed as:

$$\alpha = \ominus(p, \beta)$$

where $$\beta = \{\alpha_i\}^{k-1}_{i=0}$$

are the trainable sets of parameters, k is the number of control points and $\ominus$ is the phase function that is taken to be the cubic Catmull-Rom spline. The latter has several important benefits, as $\ominus$ can be easily made cyclic by forcing the start and end control points to be the same. Further, $\ominus$ can vary smoothly with the change of the phase parameter. In at least one embodiment, a number of control points k can be set to a value such as 4. For this case, phase function $\ominus$ can have the following look:

$$\ominus(p, \beta) = \frac{1}{2} \begin{bmatrix} 2\alpha_{k_1} \\ \alpha_{k_2} - \alpha_{k_0} \\ 2\alpha_{k_0} - 5\alpha_{k_1} + 4\alpha_{k_2} - \alpha_{k_3} \\ 3\alpha_{k_1} - 3\alpha_{k_2} + \alpha_{k_3} - \alpha_{k_0} \end{bmatrix}^T \begin{bmatrix} 1 \\ v \\ v^2 \\ v^3 \end{bmatrix}$$

where $\beta = \{a_i\}$, $i = [0 \ldots 3]$ and the parameters v and $\{k_n\}$, $n = [0 \ldots 3]$ are defined as follows:

$$v = \frac{4p}{2\pi}(\text{mod } 1); \, k_n = \left\lfloor \frac{4p}{2\pi} \right\rfloor + n - 1(\text{mod } 4)$$

In at least one embodiment, architecture of a Mode-Adaptive Neural Network (MANN) is greatly inspired by that of a PFNN network, but with some important differences. For example, instead of using a phase function to compute the parameters $\alpha$ of the motion prediction network $F(x_t; \alpha)$ a gaiting network $\Omega(\hat{x}_t)$ could be utilized. The latter operates on the input vector $\hat{x}_t$, which is a subset of $x_t$ that includes the foot end effector velocities, current action variables and the desired velocity of the character. Given this input $\Omega(\hat{x}_t)$ then predicts a set of weights $w = \{w_i\}$, $i = [0 \ldots k-1]$ that are used to compute the parameters $\alpha$ of the motion prediction network F as follows:

$$\alpha = \sum^{k-1}_{i=0} w_i \alpha_i, \, w = \{w_i\}^{k-1}_{i=0} = \Omega(\bar{x}_t) : \sum^{k-1}_{i=0} w_i = 1$$

where $$\{\alpha_i\}^{k-1}_{i=0}$$

are the sets of trainable parameters similar to the ones defined in paragraph 0028. An advantage of such an approach resides in its applicability to a broader variety of motions as compared to PFNN, and does not require a tedious procedure of labeling the value of a phase parameter during preparation of a training dataset.

While both MANN- and PFNN-based methods have shown great improvement in animation quality with respect to conventional deep neural networks, approaches in accordance with various embodiments can provide for further improvement in generated animation, such that this animation is more realistic from a human viewer perspective.

Certain motion prediction methods rely on an autoregressive inference strategy, whereby at each time step the prediction of the network is used as the input to the network at the subsequent step. Such an approach, however, makes the inference task very hard for the network as at training time is has only seen the ground truth poses as input. Consequently this may lead to a decrease in animation quality.

Approaches in accordance with various embodiments can mitigate this issue by running a motion prediction network in an autoregressive manner at training time as well. In at least one embodiment, a simulator could be included in a training loop, but such an approach may be quite costly and lead to significant decrease in the training speed. Instead, approaches in accordance with various embodiments can start with a sequence of inputs $\{x_t\}, t \in [1 \ldots T]$ and the respective sequence of ground-truth labels $\{y_t\}$. Output $z_1$ of the motion prediction network F can then be computed for the first element of input sequence $x_1$. In order to compute the prediction of F for the second element of this input sequence ($x_2$) in an autoregressive manner, pose $P_1$ of the character from the prediction $z_1$ would need to be fed back to F together with the updated values for other parameters of the state $R_1$ (e.g., height maps) computed from the simulator. The latter may however be relatively slow, such that these values may be extracted instead from the second element of input sequence $x_2$. This operation can then be repeated for all the elements of the training sequence, leaving an approximation of an autoregressive training process. Such an approach is briefly summarized in the following algorithm:

---

Algorithm 1: Autoregressive training of the motion prediction network

---

Data: Input: $\{x_t\}$ : $x_t$, $t \in [1..T]$,
Motion prediction network: $F(\cdot)$
Result: Prediction $\{z_t\}$ : $z_t$, $t \in [1..T]$
for t in [1..T] do
  | if t = 1 then
  | | $z_0 \leftarrow F(x_0)$ ;            // Estimate the prediction for the first time step
  | else
  | | $\{P_t, R_t\} \leftarrow$ Split($x_t$) ;    // Split predicted data to pose $P_t$ and all the rest $R_t$
  | | $\{\hat{P}_{t-1}, \hat{R}_{t-1}\} \leftarrow$       // Split predicted data to pose $\hat{P}_{t-1}$ and all the rest $\hat{R}_{t-1}$
  | | Split($z_{t-1}$) ;
  | | $\hat{X}_t \leftarrow$              // Form current input $\hat{X}_t$ from predicted pose $\hat{P}_{t-1}$ and ground-
  | | Combine($\hat{P}_{t-1}$, $R_t$) ;                     truth $R_t$
  | | $z_t \leftarrow F(\hat{X}_t)$ ;      // Estimate motion prediction for the current time step
  | end
end

---

30

Though such an approach may be an approximation of autoregressive training, it can achieve various benefits, such as the network seeing imperfect poses of a character, which leads to better generalization and ability to correct for the pose estimation mistakes. Further, the training does not include the possibly time-consuming simulation step, which allows to preserve the training speed.

Given the estimated autoregressive predictions, the average Mean Squared Error (MSE) can be computed across all the time steps [1 . . . T], as may be given by:

$$L = \frac{1}{T}\sum_{t=1}^{T} \left( \|z_t - y_t\|_{L_2} \right)$$

where $z_t, t \in [1 . . . T]$ is the network predictions computed as described in Algorithm 1.

Performance of a PFNN-based approach can be quite stable even when the training dataset is very unbalanced in terms of the number of samples with, for example, flat and rocky terrains. This stability comes, at least in part, from the fact that PFNN uses a phase of the current motion gait, which serves as a strong prior. While being more flexible than PFNN, a MANN-based method does not rely on the phase of the motion gait at training and inference times, and therefore depends on the quality of the training datasets and may easily overfit to when the data for a specific type of motion or environment is scarce. This may lead to some artifacts like leg sliding or unrealistically looking animation.

Various embodiments can address this dataset imbalance problem by re-weighting the contribution of each of the training samples to the final objective function based, at least in part, on a frequency of appearance the respective height map type in the dataset. Such an approach can involve clustering the data in the training set by corresponding height maps using a k-means clustering, for example, with a fixed number of clusters K. K is a parameter of the algorithm presented previously. For each of the clusters $C_k$, k=[1 . . . K] a number of elements can be computed from the dataset $N_{C_k}$ that belong to it, which provides statistics of appearance of different types of environments in the training data. A majority of the data belongs to cluster 0, which essentially corresponds to flat surfaces. After clustering has completed, a contribution of each of the elements in the dataset to the final objective function can be computed as follows:

$$w_i = \text{off}\left(\frac{N_{C(i)}}{\sum_{k=1}^{K} N_{C_k}} + \text{off}\right)^{-1}$$

Here $w_i$ is the contribution of the $i^{th}$ training sample inside the objective function; C(i) is the cluster that the $i^{th}$ training sample belongs to; $N_C$ is the coordinality of the data cluster C and off=0.25 is a positive offset.

In order to make the generated animation even closer to the ground truth animation, an adversarial objective term can be added to the optimization loss. To compute this adversarial objective, a temporal discriminator D can be used that receives as input sequences of character poses, both predicted by the network and extracted from the ground truth data. A goal of D in this situation is then to distinguish whether each of these sequences is real or not. The temporal nature of D allows it to learn the smooth transitions between gaits and forces the motion prediction network to better adjust to high frequency information of the training data which, in turn, leads to higher variability of predicted motion.

In order to efficiently gather information from the predictions of a prediction network for multiple consecutive time steps, one or more Long Short-Term Memory (LSTM) units can be utilized in the discriminator architecture. In at least one embodiment, this model receives a sequence of full output states from the motion prediction network and returns the latent representation that gather the information from all the temporal predictions. This latent representation is then processed by a sequence of fully-connected layers that ultimately predict whether the sequence of input samples is generated or coming from the ground-truth data.

Further, a discriminator model in at least one embodiment can be conditioned on the true height map estimates and gait values that correspond to the current time step. This allows the discriminator to better focus on different types of motions for different types of environments and gaits.

In at least one embodiment, a prediction model can be trained using a Wassertein objective function. Parameters $\omega$ of the discriminator $D_{\omega}(\bullet)$ can be trained by minimizing an objective such as may be given by:

$$\omega \leftarrow \nabla_{\omega} \frac{1}{m} \left( \sum_{i=1}^{B} D_{\omega}(y_i) - \sum_{i=1}^{B} D_{\omega}(F_{\theta}(x_i)) \right)$$

where $\theta$ and $\omega$ are parameters of the motion prediction network and discriminator respectively, and B denotes the number of samples in the batch. Motion prediction network $F_{\theta}(\bullet)$ can then be trained using an objective term, such as:

$$\theta \leftarrow -\nabla_{\theta} \frac{1}{m} \sum_{i=1}^{B} D_{\omega}(F_{\theta}(x_i))$$

which is added to the main loss function. Such a loss function can be more effective, compared to a commonly-used Cross-Entropy loss in bridging the gap between the generated and ground truth distributions of character poses.

In at least one embodiment, adding adversarial loss to the optimization objective can significantly improve the visual quality of the generated animation using the PFNN motion prediction network. However, the quality of the MANN method very much depends on the size of the dataset that is being used for training. As such, if the dataset is not large enough then a MANN-based approach may be is prone to overfitting to the training samples, which can lead to the appearance of various artifacts at inference time, such as leg sliding and unrealistic pose generation. To overcome this problem, approaches in accordance with various embodiments add phase-based regularization to the network for such gaits, where the phase is available. This essentially makes the model more robust to different environments, such that the resulting animation looks more realistic. To achieve this and preserve the independence of the MANN architecture from phase at the inference time, ground-truth phase data can be added as an additional input to the discriminator network. Conditioning the discriminator in such a way can provide a necessary temporal regularization to the motion prediction network and result in generated animation of higher quality.

Figure 3:
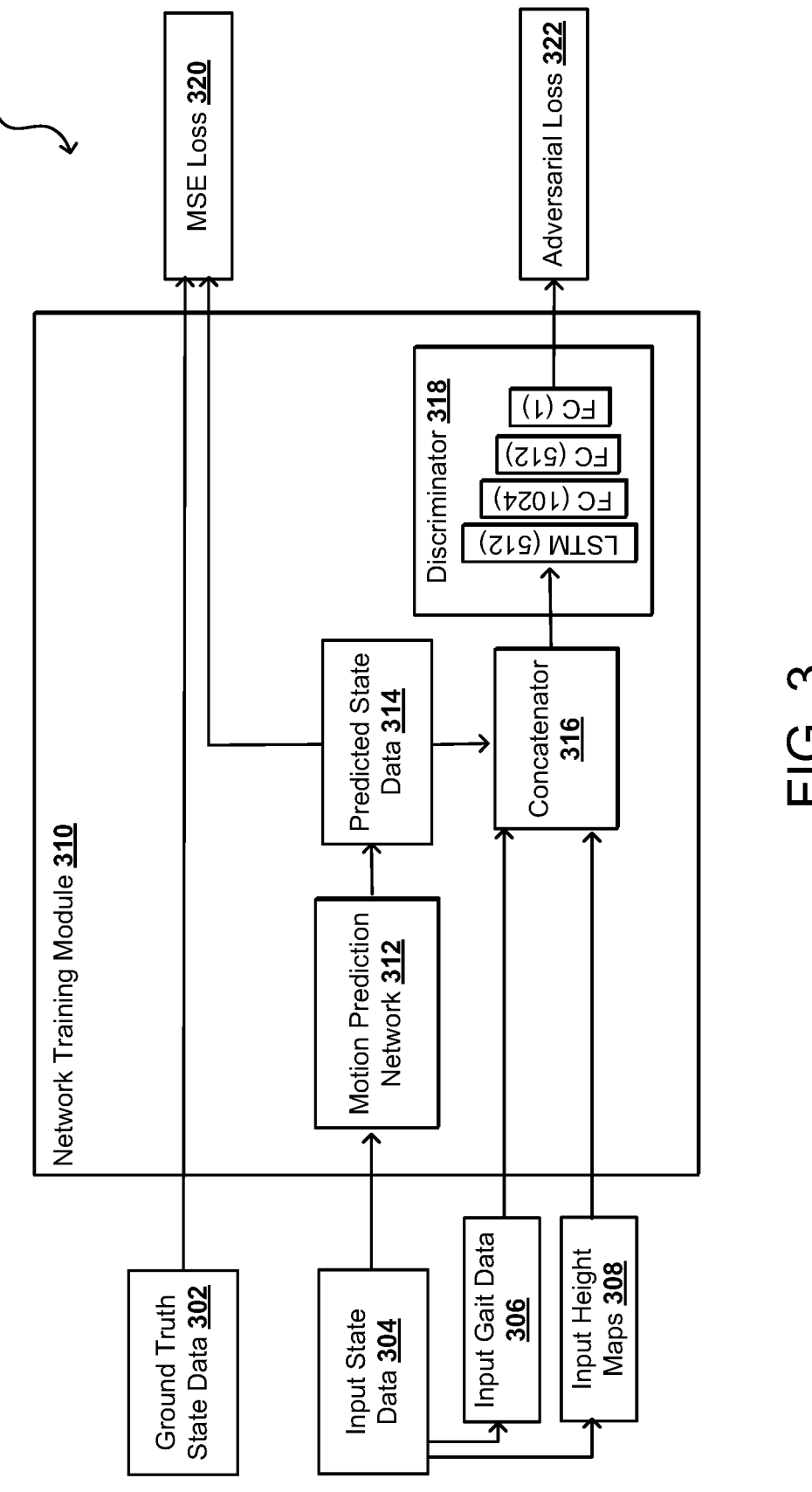
FIG. 3 illustrates an example training architecture, according to at least one embodiment.

FIG. 3 illustrates an example architecture 300 that can be utilized in accordance with various embodiments. In this example, the input state data 304 corresponds to a sequence of consecutive frames $X=\{x_t\}, t \in [1 \ldots T]$, which are passed through a motion prediction network 312. The input state data 304 can be passed through the motion prediction network 312 in an autoregressive manner, as depicted by Algorithm 1 presented previously. The motion prediction network 312 can produce predicted state data 314 that includes a sequence of predicted states $Y=\{y_t\}$. This sequence of predicted states can then be passed to a temporal discriminator 318 of a generative adversarial network (GAN) synthesized on top of the motion prediction network 312. Input to the discriminator 318 can also include separated input gait data 306 (e.g., climbing, running, or jumping) and height maps 308, which may have been concatenated with the predicted state data using a concatenator 316. In at least one embodiment, a temporal discriminator network 318 can include at least one long short-term memory (LSTM) module, followed by a sequence of fully-connected layers (FC). In at least one embodiment, these can be separated by a leaky ReLU activation function. The temporal discriminator network can be conditioned on the gait of the current motion $$\{t_i^a\}$$

and on the heightmap of the environment that surrounds the virtual character $\{h_t\}$ The discriminator 318 can then output an adversarial loss 322 determined as discussed elsewhere herein. The predicted state data 314 from the motion prediction network 312 can also be compared against the ground truth state data 302 to determine another loss value, such as a Mean Squared Error (MSE) loss. These loss values can then be used to adjust network parameters for a subsequent training pass in order to attempt to optimize the network and minimize an overall loss determined by a loss function that includes these two loss values.

Figure 4A:
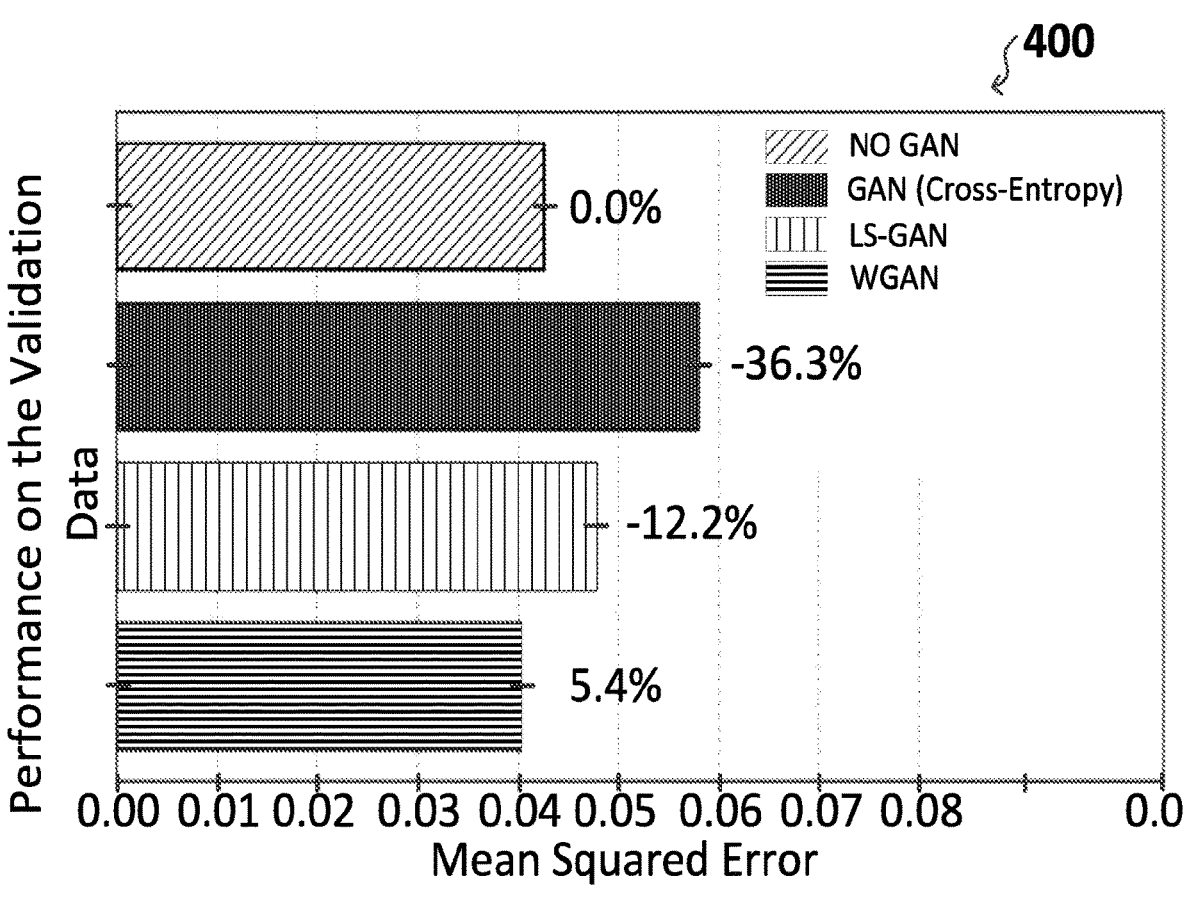
FIGS. 4A and 4B illustrate performance data for different models, according to at least one embodiment.
Figure 4B:
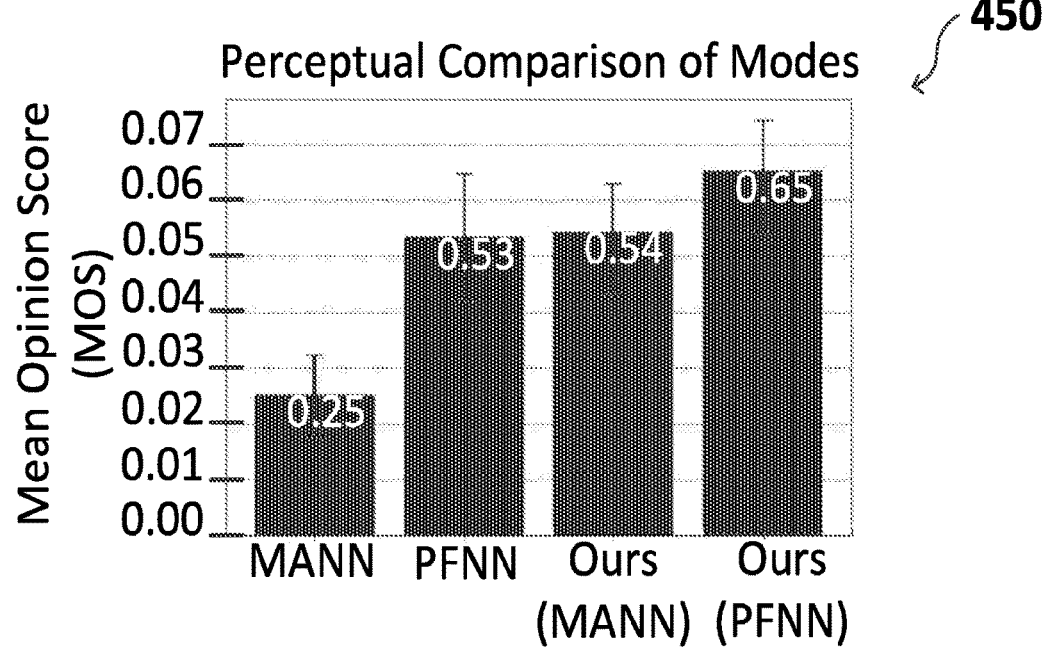

In an experiment using such an architecture in accordance with one embodiment, an Adam optimizer was utilized with learning rate $10^{-4}$. A sequence of T=9 frames was used as input to an autoregressive training procedure as discussed herein. A value such as this has been determined to be enough to generate a strong temporal context for the discriminator in many embodiments, which in turn allows generating both realistic and variable motions. In various experiments a motion capture dataset is utilized with pre-processing performed to convert the raw data to a set of pairs that contain the input to the motion prediction network and the ground truth in the format described elsewhere herein. FIG. 4A illustrates a comparison 400 of results for different GAN-based approaches on this dataset (no GAN, cross-entropy based GAN, least squares GAN, and Wasserstein GAN). A GAN in accordance with at least one embodiment can utilize an objective function based on a Wasserstein metric, which provides a distance function defined between probability distributions on a given metric space. Percentages next to the bars show the relative improvement with respect to the method without GAN, according to the validation set. As illustrated, the quality of the generated animation can depend significantly on the choice of the GAN optimization objective. In all the cases a PFNN was utilized as the backbone motion prediction network. The architecture of the discriminator was also fixed, with changes only to the way in which the GAN objective function is computed. The performance of these techniques on the validation data was evaluated by computing the Mean Squared Error (MSE) of the predicted pose of the character with respect to the ground truth data, as illustrated in FIG. 4A. Other methods fail to improve the performance, which happens due to the fact that the distributions of the predicted and ground truth character poses are quite different from each other and the GAN objective function is not able to successfully bridge this gap. FIG. 4B provides a graph 450 illustrating an evaluation of visual performance of different methods according to the Mean Opinion Score (MOS) measure.

The performance of an approach in accordance with at least one embodiment can be compared to that of the baseline methods of PFNN and MANN. Such an approach can modify the optimization objective and the training strategy, while keeping the motion prediction architecture untouched. Other techniques could be utilized as well, as may be capable of generating character motion, thus making this approach substantially general. Such an approach can improve the perceived quality of generated animation for a motion prediction network by modifying its objective function and training procedure.

FIG. 5 illustrates an example process 500 for training a motion prediction model that can be utilized in accordance with various embodiments. It should be understood for this and other processes discussed herein that there can be additional, alternative, or fewer steps performed in similar or at least partially alternative orders, or in parallel, within the scope of the various embodiments unless otherwise stated. In this example, input state data is received 502 for a sequence of frames of training data. For training purposes, associated ground truth data can also be received or obtained in this training data set. This first input state data can be provided 504 as input to a motion prediction network, and a prediction received for the next frame. In at least some embodiments the state data may undergo some amount of preprocessing, at least to place the data in an appropriate format for the motion prediction network. This prediction can be aggregated 506 with the gait and heat map values from the input state data and passed to the motion prediction network. This aggregating can be repeated for all frames in the input sequence, and a predicted sequence frames of animation passed 508 as input to a temporal discriminator. Using the gait and map data as conditions, the temporal discriminator of a generative adversarial network (GAN), synthesized on top of the motion prediction network, can determine 510 an adversarial loss value. In other embodiments, a temporal convolutional or recurrent network could be used as well. A loss such as a Mean Squared Error (MSE) loss value can also be determined 512, in sequence or in parallel, by comparing the predicted and ground truth frames. One or more parameters of this motion prediction network can then be adjusted 514 to minimize an overall loss, using a loss function that includes terms for both the MSE loss and the adversarial loss. A determination can be made 516 as to whether an end condition or criterion has been satisfied, such as where a maximum number of training passes has been reached or a convergence criterion has been satisfied. In at least one embodiment, if an end condition has been satisfied then these trained models can be provided 518 for inferencing, otherwise training can continue with a next pass or iteration.

Figure 6:
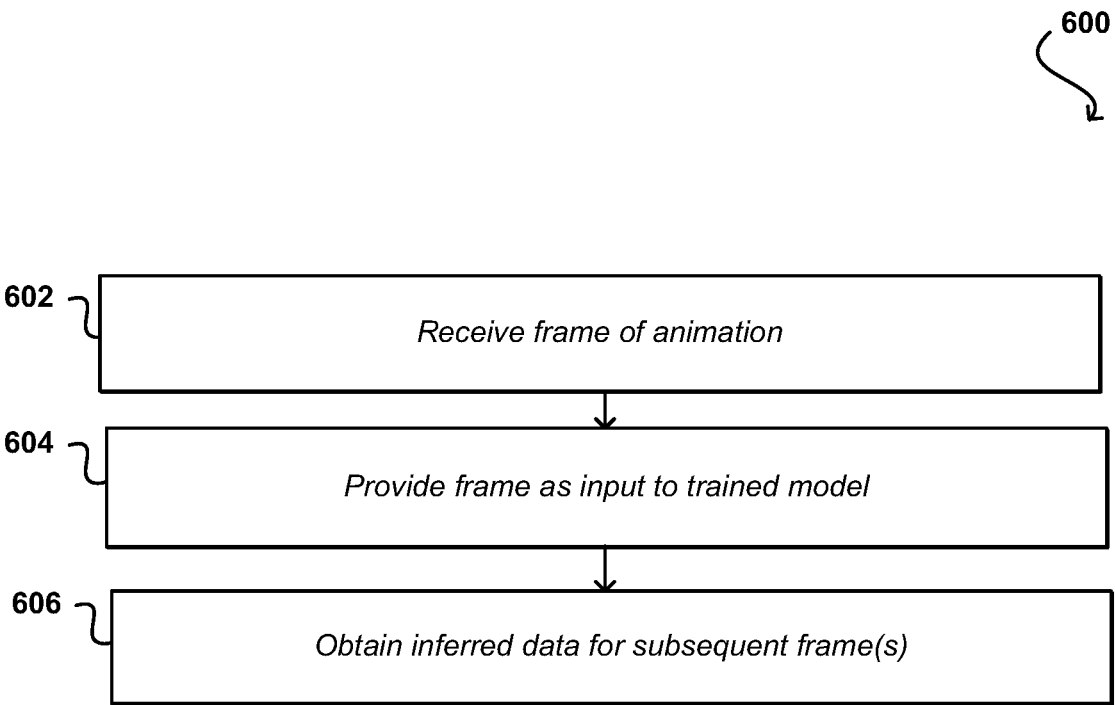
FIG. 6 illustrates an example process 600 for generating character state for a frame, according to at least one embodiment.

In at least one embodiment, a process 600 illustrated in FIG. 6 can be used, at inference time, to infer notion or animation data. In at least one embodiment, one or more instances of frame data can be received 602 and provided 604 as input to a trained model, such as a trained motion prediction model. In at least one embodiment, inferred data can be received 456 as output from this trained model, where that inferred data may relate to predicted motion, state, or animation data for at least one instance of frame data.

Inference and Training Logic

Figure 7A:
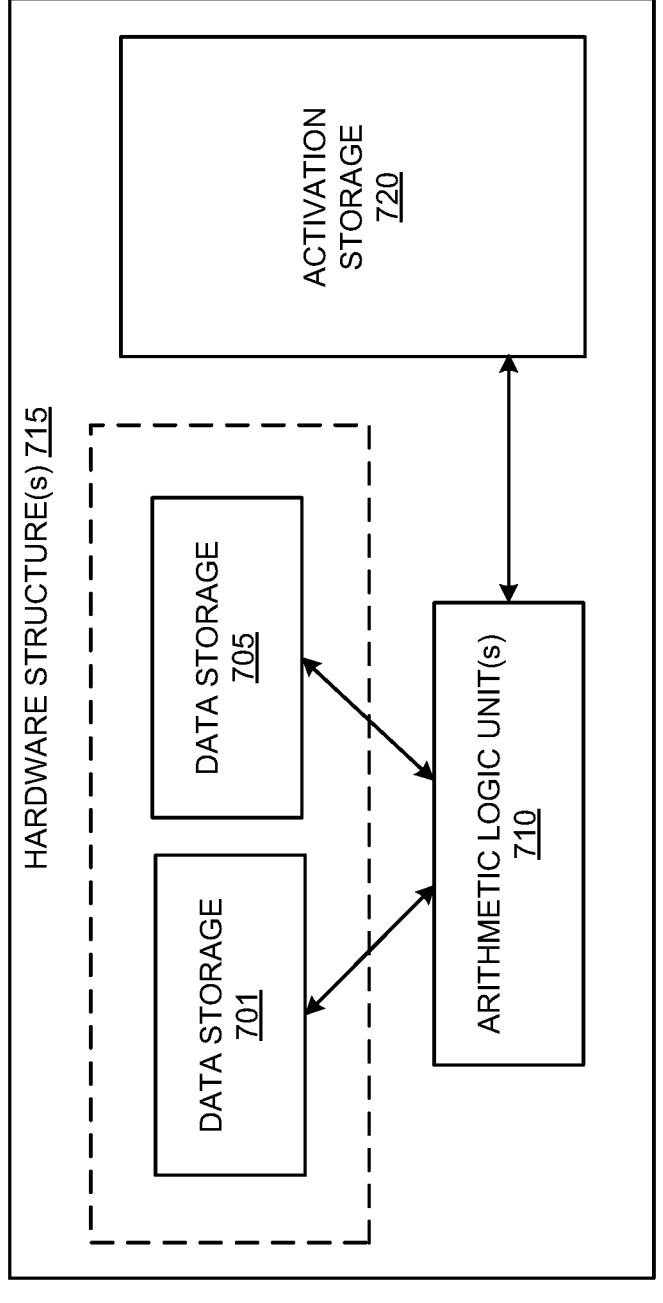
FIG. 7A illustrates inference and/or training logic, according to at least one embodiment.

FIG. 7a illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7a may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7a may be used in conjunction with central processing unit ("CPU") hardware, graphics processing unit ("GPU") hardware or other hardware, such as field programmable gate arrays ("FPGAs").

Figure 7B:
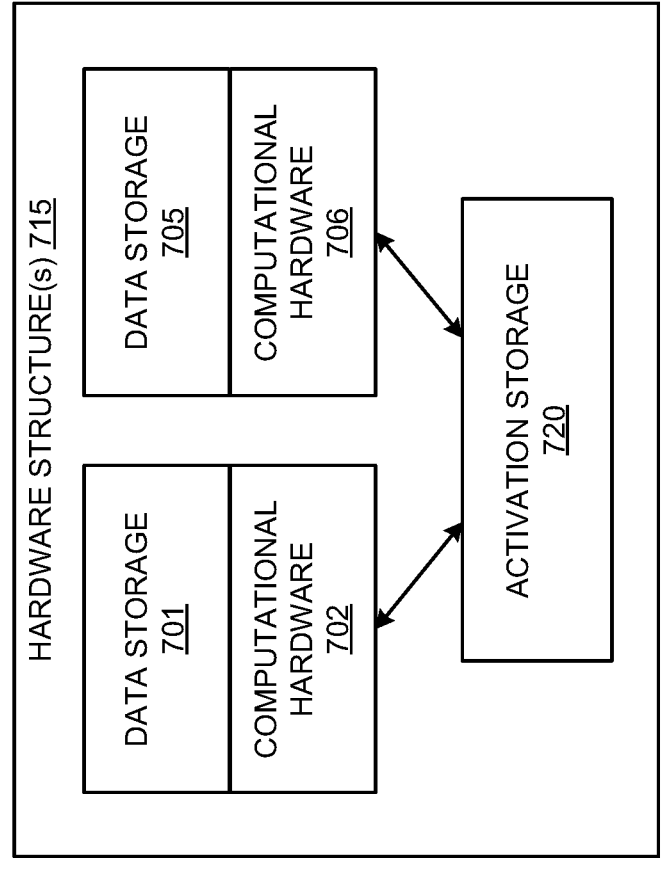
FIG. 7B illustrates inference and/or training logic, according to at least one embodiment.

FIG. 7b illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7b may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7b may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7b, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
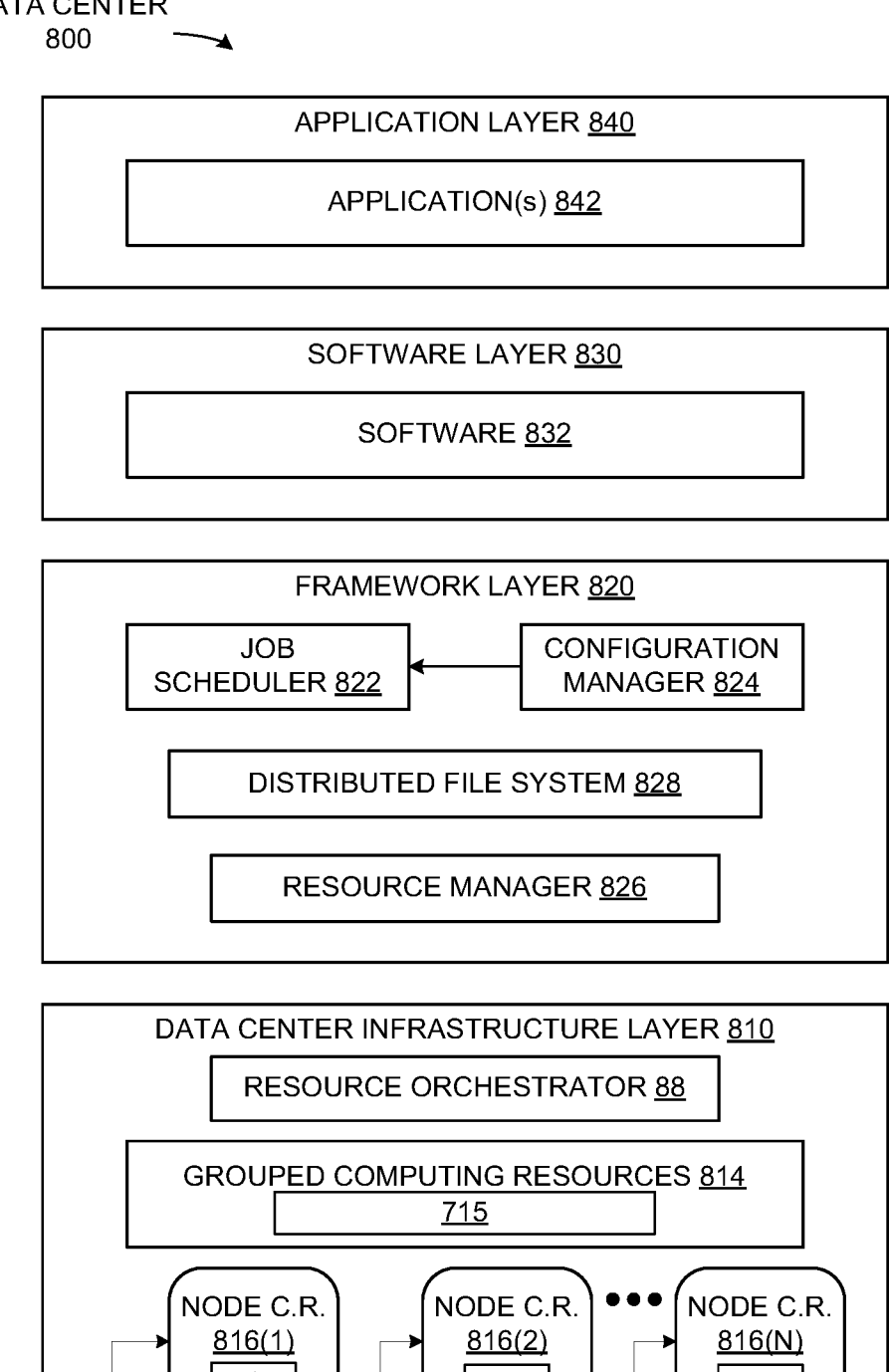
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to predict motion for generating animation. This can include using a motion prediction network trained as discussed herein to generate individual frames of animation.

Computer Systems

Figure 9:
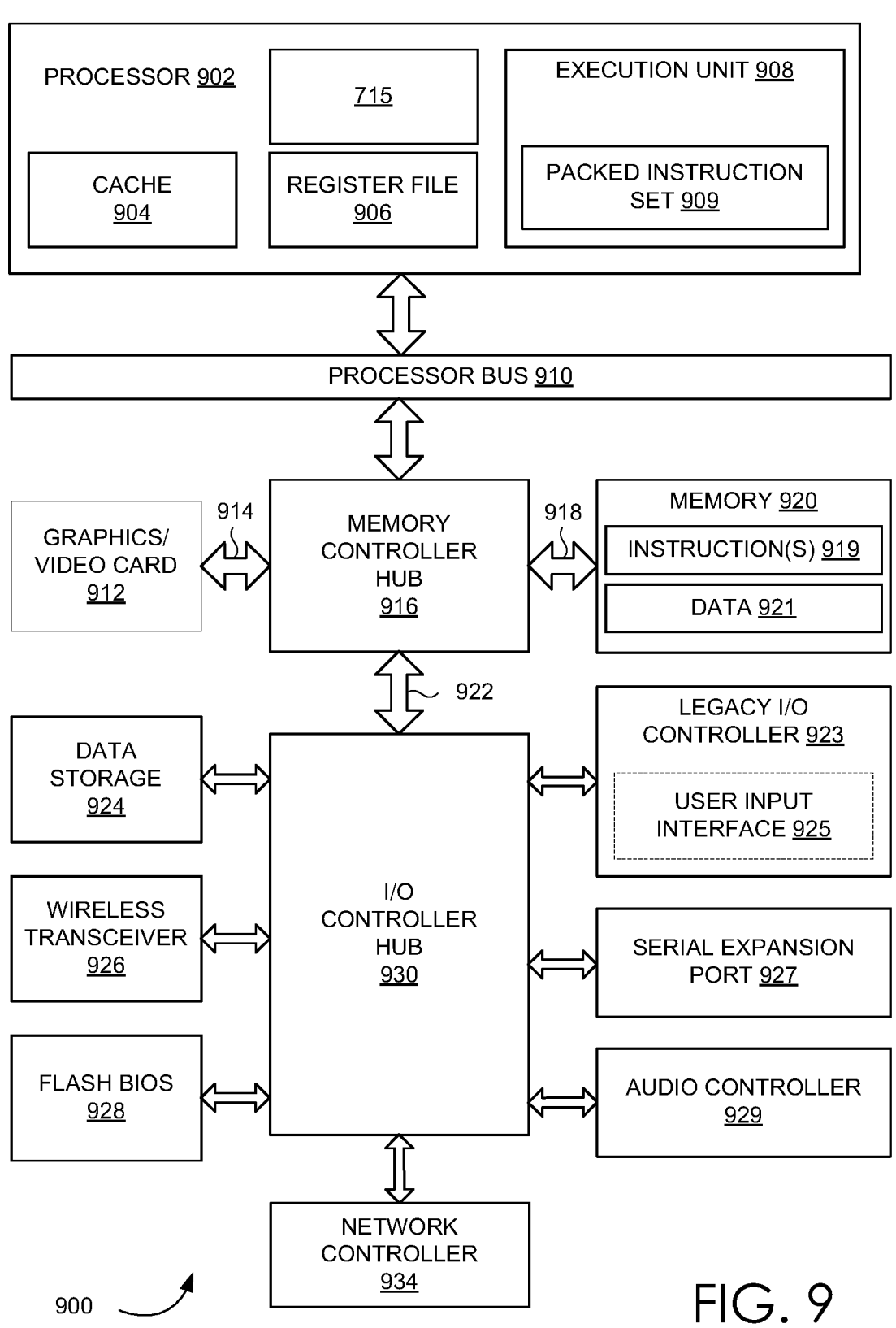
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to predict motion for generating animation. This can include using a motion prediction network trained as discussed herein to generate individual frames of animation.

Figure 10:
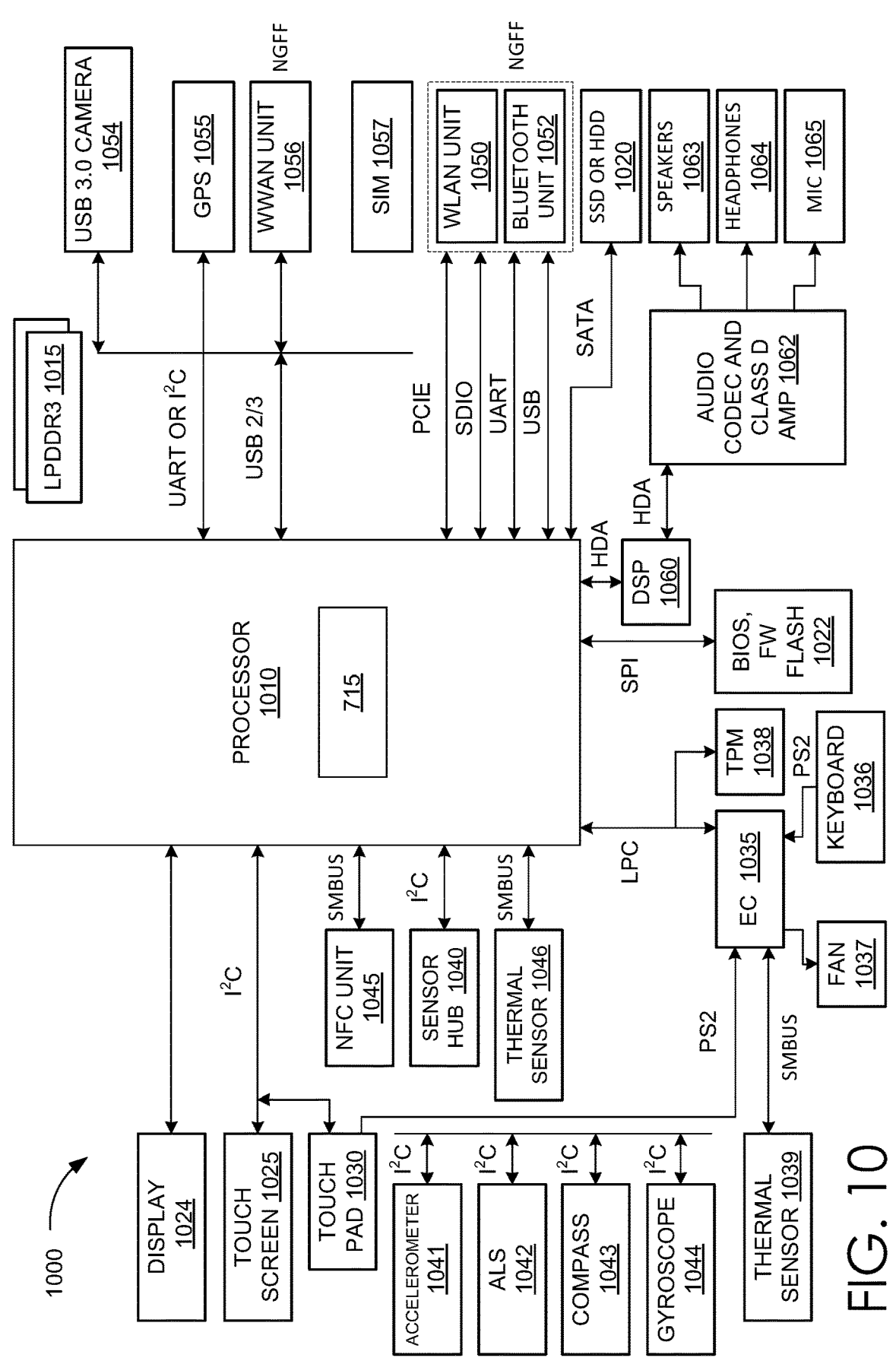
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1046, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7a and/or 7b. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to predict motion for generating animation. This can include using a motion prediction network trained as discussed herein to generate individual frames of animation.

Figure 11:
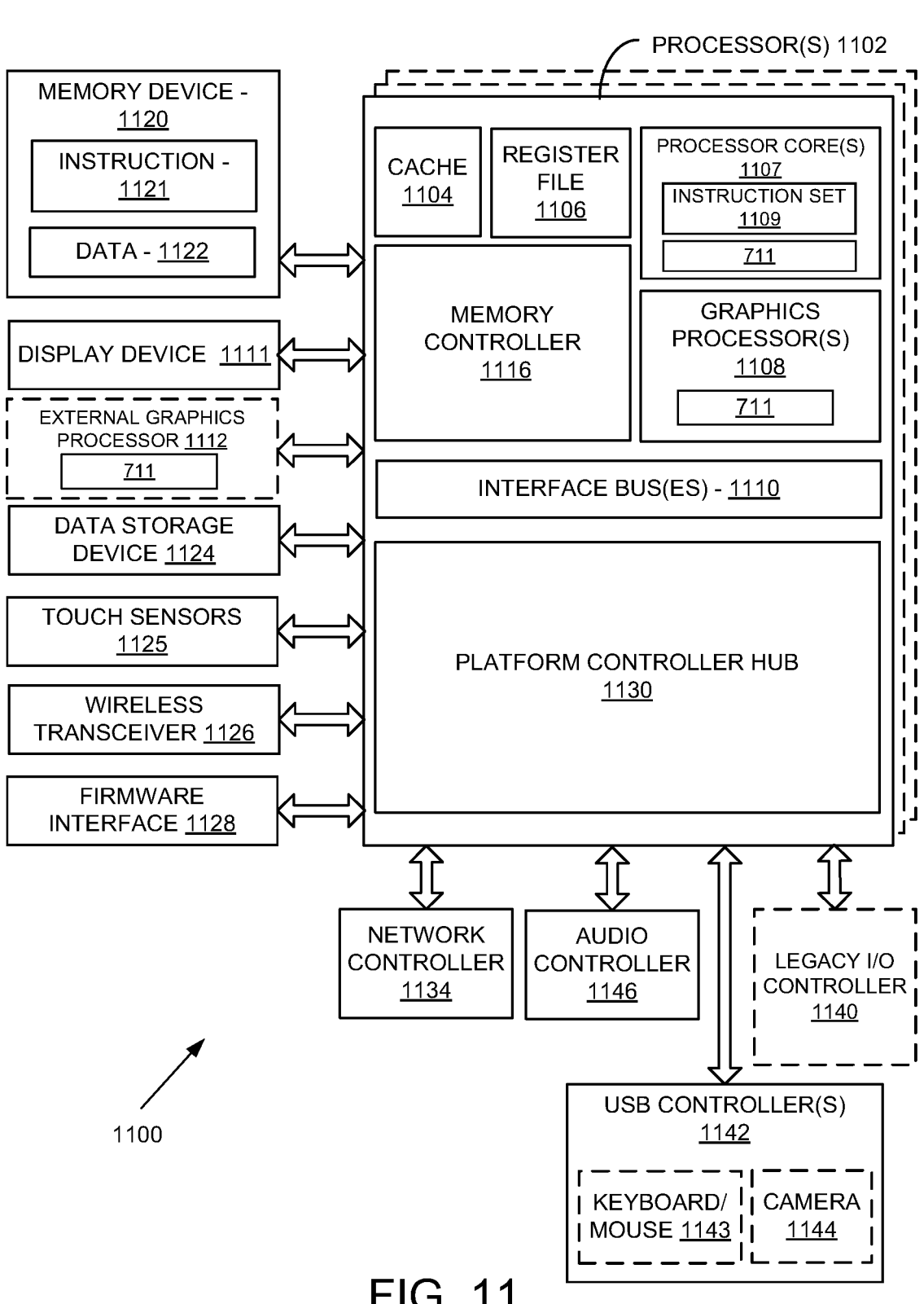
FIG. 11 illustrates at least portions of a graphics processor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to predict motion for generating animation. This can include using a motion prediction network trained as discussed herein to generate individual frames of animation.

Figure 12:
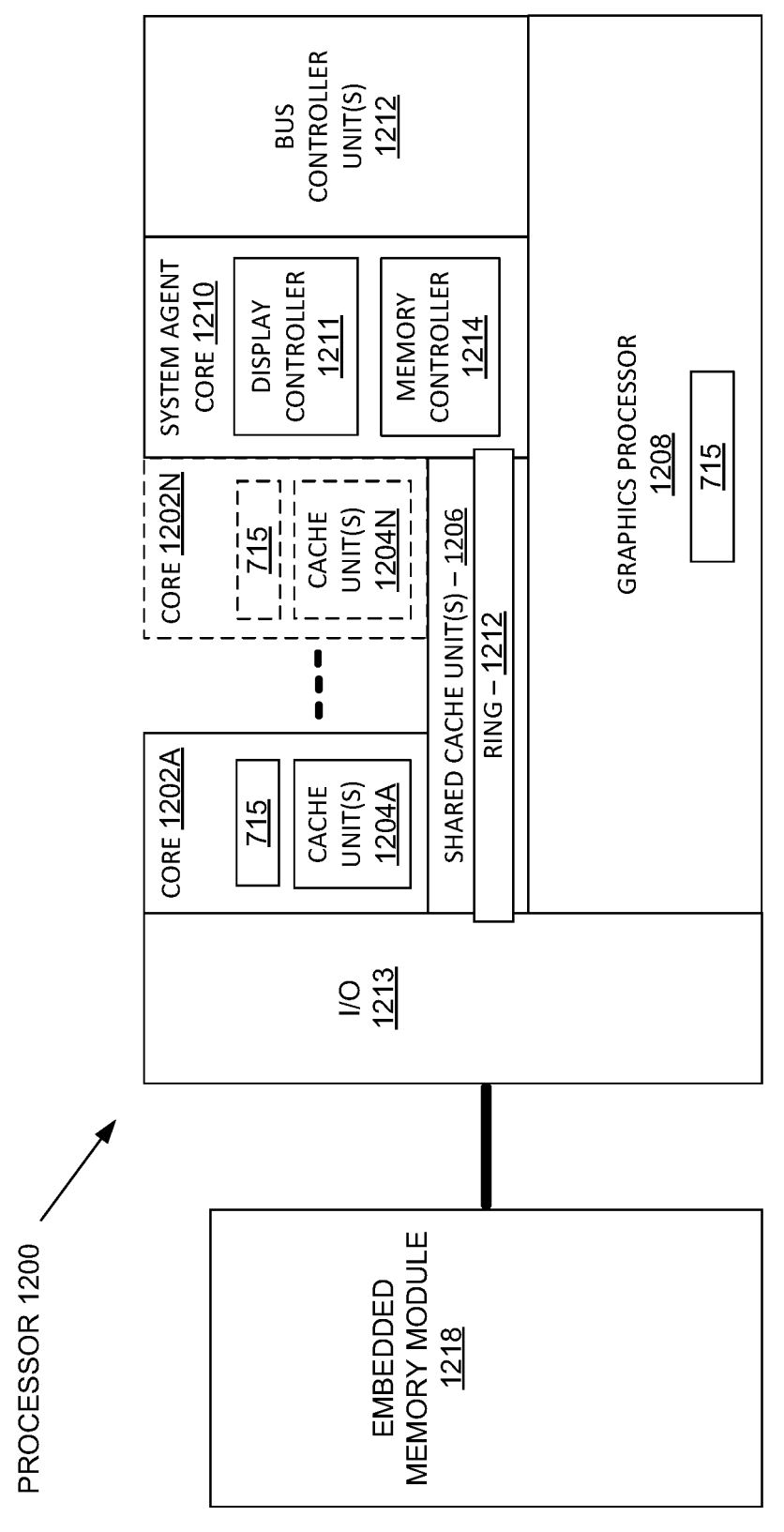
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multi-threading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7a and/or 7b. In at least one embodiment portions or all of inference and/or training logic 715 may be incorporated into processor 1200. For example, in at least one embodiment, training and/or inferencing techniques described herein may use one or more of ALUs embodied in graphics processor 1512, graphics core(s) 1202A-1202N, or other components in FIG. 12. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to predict motion for generating animation. This can include using a motion prediction network trained as discussed herein to generate individual frames of animation.

Virtualized Computing Platform

Figure 13:
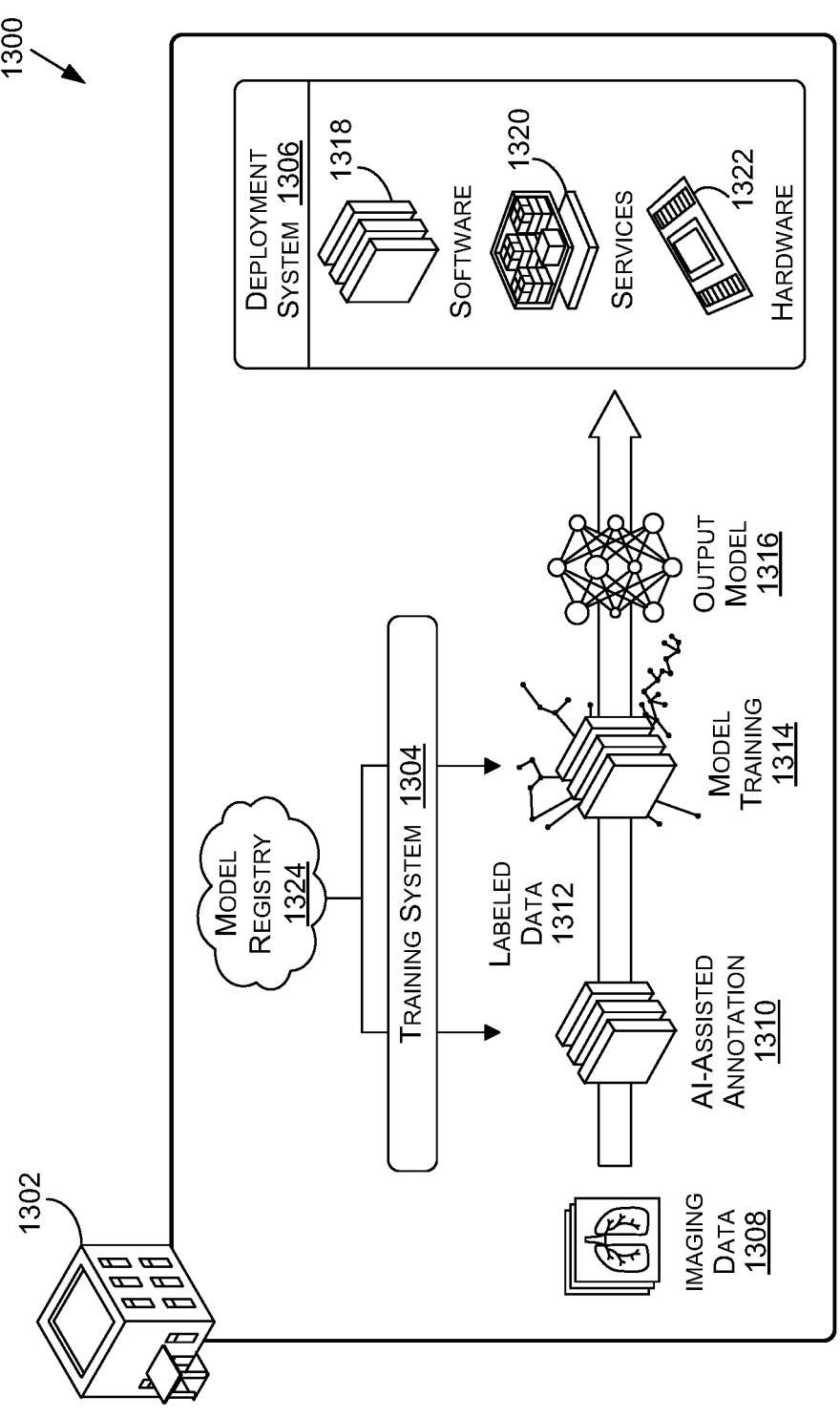
FIG. 13 is an example data flow diagram for an advanced computing pipeline, in accordance with at least one embodiment.

FIG. 13 is an example data flow diagram for a process 1300 of generating and deploying a frame processing and inferencing pipeline, in accordance with at least one embodiment. In at least one embodiment, process 1300 may be deployed for use with imaging devices, processing devices, and/or other device types at one or more facilities 1302.

Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility (ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1426 of FIG. 14) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1404 (FIG. 14) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, training pipeline 1404 (FIG. 14) may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deployment system.

In at least one embodiment, training pipeline 1404 (FIG. 14), a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represent a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

Figure 14:
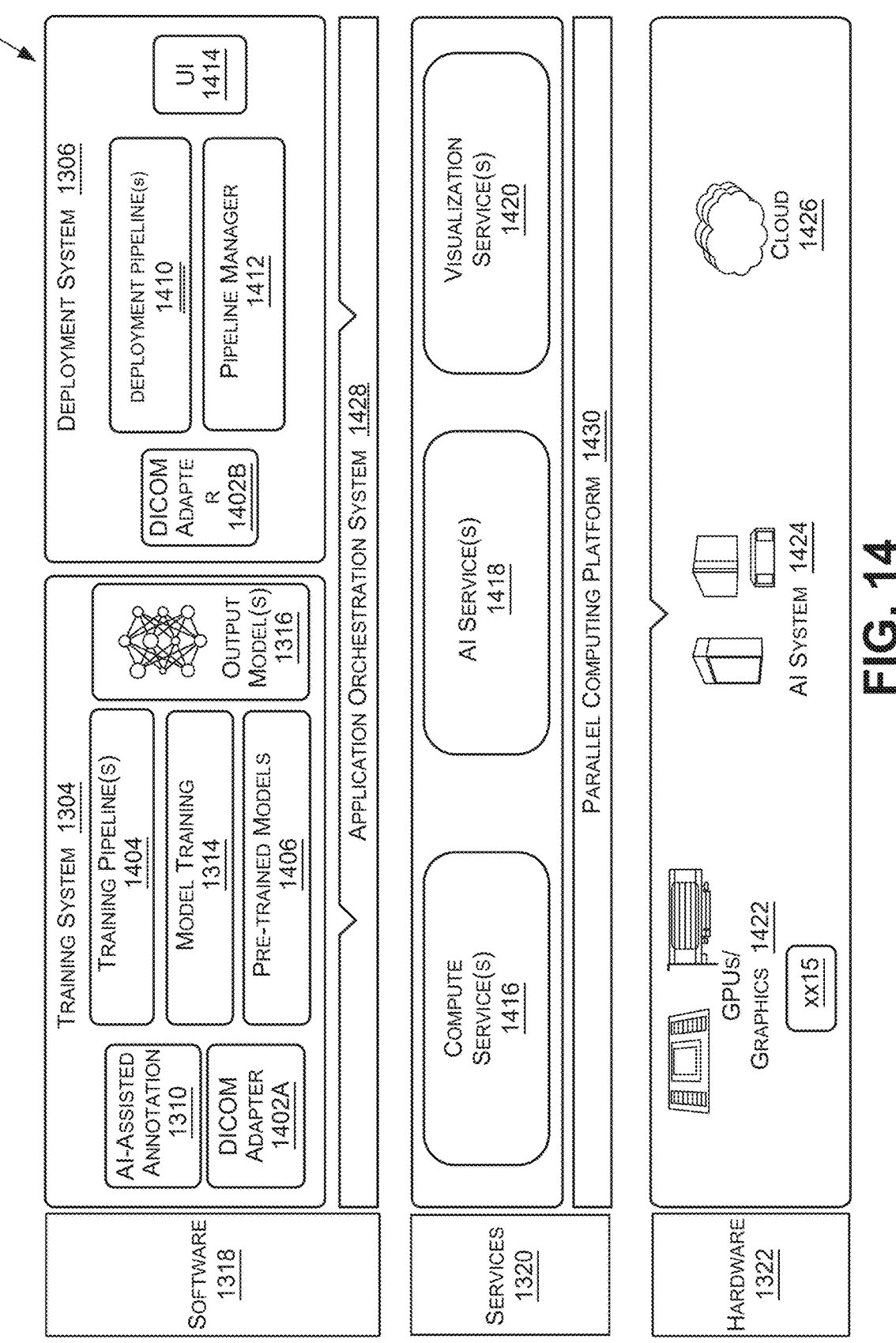
FIG. 14 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal). In at least one embodiment, a radiologist may receive results from an data processing pipeline including any number of application and/or containers, where results may include anomaly detection in X-rays, CT scans, MRIs, etc.

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1430 (FIG. 14)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 15A:
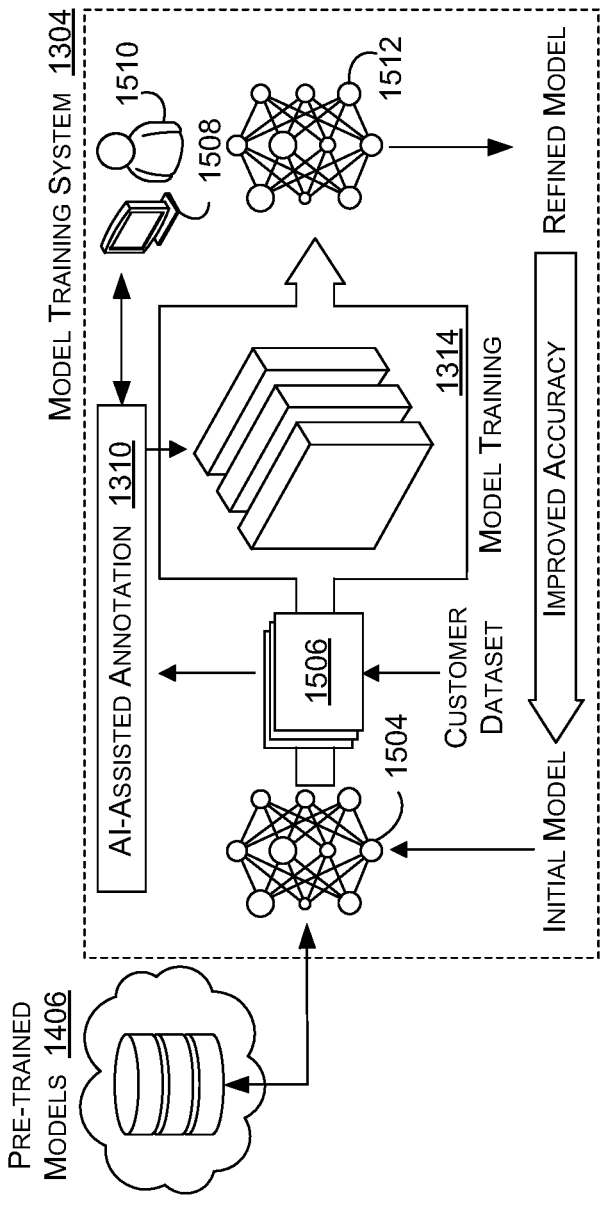
FIGS. 15A and 15B illustrate a data flow diagram for a process to train a machine learning model, as well as a client-server architecture to enhance annotation tools with pre-trained annotation models, in accordance with at least one embodiment.
Figure 15B:
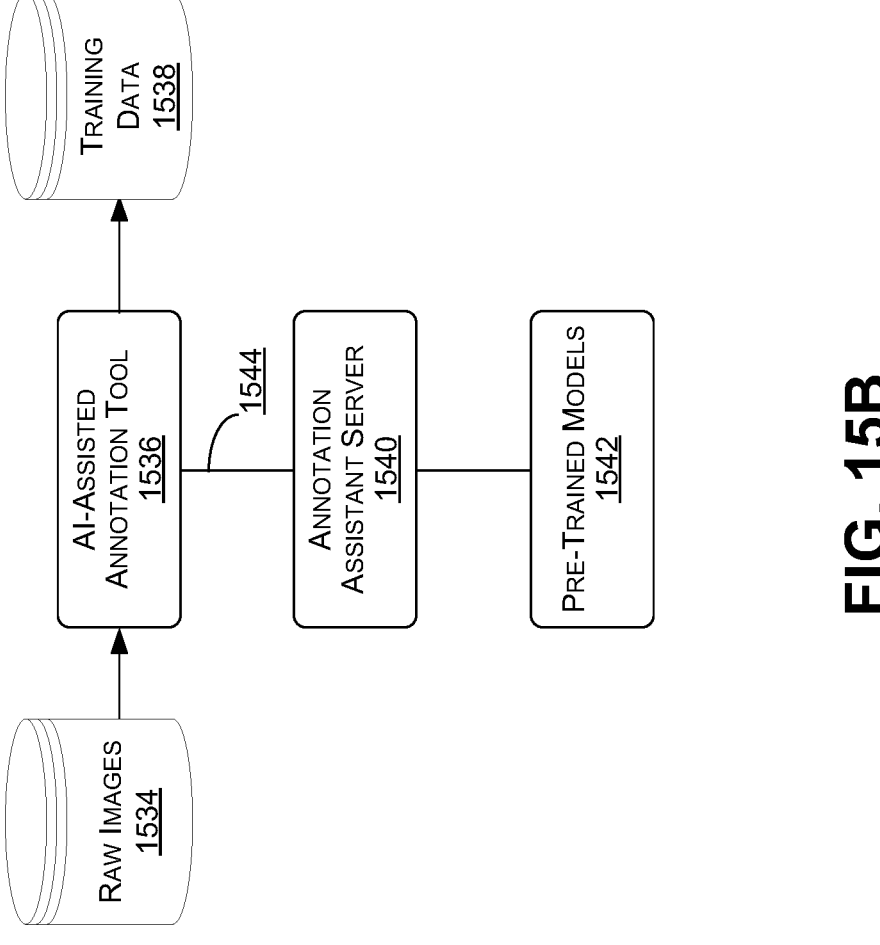

In at least one embodiment, training pipelines 1404 may include AI-assisted annotation, as described in more detail herein with respect to at least FIG. 15B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an Mill machine, there may be a first deployment pipeline 1410, and where image enhancement is desired from output of an Mill machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 132—deployment pipelines 1410 may be even more user friendly, provide for easier integration, and produce more accurate, efficient, and timely results.

In at least one embodiment, deployment system 1306 may include a user interface 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples (e.g., as illustrated in FIG. 12cc) pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched.

Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services 1320 and/or hardware 1322 of system 1400, as described herein. In at least one embodiment, refined models 1512 generated by process 1500 may be executed by deployment system 1306 for one or more containerized applications in deployment pipelines 1410.

In at least one embodiment, model training 1314 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1314 may not take as long or require as much processing as training a model from scratch. In at least one embodiment, during model training 1314, by having reset or replaced output or loss layer(s) of initial model 1504, parameters may be updated and re-tuned for a new data set based on loss calculations associated with accuracy of output or loss layer(s) at generating predictions on new, customer dataset 1506 (e.g., image data 1308 of FIG. 13).

In at least one embodiment, pre-trained models 1406 may be stored in a data store, or registry (e.g., model registry 1324 of FIG. 13). In at least one embodiment, pre-trained models 1406 may have been trained, at least in part, at one or more facilities other than a facility executing process 1500. In at least one embodiment, to protect privacy and rights of patients, subjects, or clients of different facilities, pre-trained models 1406 may have been trained, on-premise, using customer or patient data generated on-premise. In at least one embodiment, pre-trained models 1406 may be trained using cloud 1426 and/or other hardware 1322, but confidential, privacy protected patient data may not be transferred to, used by, or accessible to any components of cloud 1426 (or other off premise hardware). In at least one embodiment, where a pre-trained model 1406 is trained at using patient data from more than one facility, pre-trained model 1406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1406 on-premise and/or off premise, such as in a datacenter or other cloud computing infrastructure.

In at least one embodiment, when selecting applications for use in deployment pipelines 1410, a user may also select machine learning models to be used for specific applications. In at least one embodiment, a user may not have a model for use, so a user may select a pre-trained model 1406 to use with an application. In at least one embodiment, pre-trained model 1406 may not be optimized for generating accurate results on customer dataset 1506 of a facility of a user (e.g., based on patient diversity, demographics, types of medical imaging devices used, etc.). In at least one embodiment, prior to deploying pre-trained model 1406 into deployment pipeline 1410 for use with an application(s), pre-trained model 1406 may be updated, retrained, and/or fine-tuned for use at a respective facility.

In at least one embodiment, a user may select pre-trained model 1406 that is to be updated, retrained, and/or fine-tuned, and pre-trained model 1406 may be referred to as initial model 1504 for training system 1304 within process 1500. In at least one embodiment, customer dataset 1506 (e.g., imaging data, genomics data, sequencing data, or other data types generated by devices at a facility) may be used to perform model training 1314 (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility (e.g., as labeled clinic data 1312 of FIG. 13).

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training 1314 to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines 1410 at a facility for performing one or more processing tasks with respect to medical imaging data.

In at least one embodiment, refined model 1512 may be uploaded to pre-trained models 1406 in model registry 1324 to be selected by another facility. In at least one embodiment, his process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation 1310, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines 1404. In at least one embodiment, pre-installed annotation tools may be improved over time as new labeled clinic data 1312 is added.

Such components can be used to predict motion for generating animation. This can include using a motion prediction network trained as discussed herein to generate individual frames of animation.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
receiving one or more frames of an input sequence;
providing the one or more frames to a motion prediction network for generating a sequence of predicted frames, the sequence representing animation of one or more virtual objects depicted in the one or more frames;
comparing the sequence of predicted frames against a sequence of ground truth frames for the animation of the one or more virtual objects to generate a first value loss value;
concatenating data for the sequence of predicted frames with at least one of gait data or height map data from the one or more frames of the input sequence, wherein the at least one of the gait data or height map data is able to be utilized as a condition for a temporal discriminator;
analyzing, using the temporal discriminator of a generative network, the sequence of predicted frames to determine an adversarial loss value; and
updating one or more network parameters for the motion prediction network to attempt to minimize an overall loss including the first loss value and the adversarial loss value.

2. The computer-implemented method of claim 1, further comprising: performing the updating of the one or more network parameters as part of an autoregressive training of the motion prediction network.

3. The computer-implemented method of claim 1, further comprising: determining the adversarial loss value using an objective function corresponding to an architecture of the generative network, wherein the generative network is a conditional, recurrent generative adversarial neural network.

4. The computer-implemented method of claim 1, wherein the generative network uses an objective function based on a Wasserstein metric, a cross-entropy loss, or a least squares function.

5. The computer-implemented method of claim 1, wherein the motion prediction network is based at least in part upon a mode-adaptive neural network (MANN) or a phase-functioned neural network (PFNN).

6. The computer-implemented method of claim 1, further comprising: determining, for the one or more frames of the input sequence, pose or state information for each of a plurality of joints of the one or more virtual objects, and wherein the motion prediction network predicts changes in the pose or state information.

7. The computer-implemented method of claim 1, further comprising:

receiving, after the motion prediction network has been trained, an input frame of an animation sequence to be generated; and receiving, from the motion prediction network, one or more subsequent frames of generated animation.

8. The computer-implemented method of claim 1, wherein the temporal discriminator includes at least one long short-term memory (LSTM) module and a sequence of fully-connected (FC) layers, separated by a leaky rectified linear unit (ReLU) activation function.

9. A system comprising:

at least one processor; and memory including instructions that, when executed by the at least one processor, cause the system to:

receive one or more frames of an input animation sequence;

provide the one or more frames to a motion prediction network for generating a sequence of predicted frames;

compare the sequence of predicted frames against a sequence of ground truth frames to generate a first value loss value;

concatenate data for the sequence of predicted frames with at least one of gait data or height map data from the one or more frames of the input sequence, wherein the at least one of the gait data or height map data is able to be utilized as a condition for a temporal discriminator;

analyze, using the temporal discriminator of a generative network, the sequence of predicted frames to determine an adversarial loss value; and update one or more network parameters for the motion prediction network to attempt to minimize an overall loss including the first loss value and the adversarial loss value.

10. The system of claim 9, wherein the instructions when executed further cause the system to:

determine the adversarial loss value using an objective function corresponding to an architecture of the generative network, wherein the generative network is a conditional, recurrent generative adversarial neural network.

11. The system of claim 9, wherein the generative network uses an objective function based on a Wasserstein metric, a cross-entropy loss, or a least squares function, and wherein the motion prediction network is based at least in part upon a mode-adaptive neural network (MANN) or a phase-functioned neural network (PFNN).

12. The system of claim 9, wherein the instructions when executed further cause the system to:

determine, for the one or more frames of the input sequence, pose or state information for each of a plurality of joints of one or more virtual objects, and wherein the motion prediction network predicts changes in the pose or state information.

13. The system of claim 9, wherein the instructions when executed further cause the system to:

receive, after the motion prediction network has been trained, an input frame of an animation sequence to be generated; and receive, from the motion prediction network, one or more subsequent frames of generated animation.

14. The system of claim 9, wherein the instructions when executed further cause the system to:

perform the updating of the one or more network parameters as part of an autoregressive training of the motion prediction network.

15. An animation generation system, comprising:

at least one processor; and memory including instructions that, when executed by the at least one processor, cause the animation generation system to:

provide an input frame to a motion prediction network, the motion prediction network trained using a temporal discriminator network utilizing gait data and height map data as conditions to generate an adversarial loss value for a sequence of frames generated from an input frame, one or more network parameters of the temporal discriminator network selected to minimize a loss including the adversarial loss value, wherein during training data for a sequence of predicted frames is concatenated with the gait data and the height map data from one or more frames of an input sequence as input to the temporal discriminator network; and receive, from the motion prediction network, one or more predicted subsequent frames of an animation sequence.

16. The animation generation system of claim 15, wherein the temporal discriminator network is configured to determine the adversarial loss value, during training, using an objective function corresponding to architecture of a generative network including the temporal discriminator network, wherein the generative network is a conditional, recurrent generative adversarial neural network.

17. The animation generation system of claim 15, wherein the instructions when executed further cause the system to:

determine, for the input frame, pose or state information for each of a plurality of joints of one or more virtual objects represented in the input frame that are to be animated.

18. One or more processors, comprising: processing circuitry to:

use one or more neural networks to generate one or more second frames of a video including one or more objects based, at least in part, on one or more first frames of the video; and use gait information of the one or more objects in the one or more first frames as an input into the one or more neural networks to determine one or more loss values to update one or more parameters of the one or more neural networks based, at least in part, on the one or more second frames.

19. The one or more processors of claim 18, wherein the one or more neural networks include a first neural network to generate a predicted motion of the one or more objects, and a second neural network to determine quality of the predicted motion.

20. The one or more processors of claim 18, wherein the processing circuitry is further to:

obtain gait data and height map data from the one or more first frames;

concatenate the gait data and the height map data with data for the one or more second frames; and train the one or more neural networks with the concatenated gait data.

21. The one or more processors of claim 18, wherein the one or more neural networks comprise a temporal discriminator including at least one long short-term memory (LSTM) module and a sequence of fully-connected (FC) layers, separated by a leaky rectified linear unit (ReLU) activation function.

* * * * *